(12) United States Patent
Desai et al.

(10) Patent No.: US 12,058,528 B2
(45) Date of Patent: Aug. 6, 2024

(54) IDENTITY NETWORK REPRESENTATION OF COMMUNICATIONS DEVICE SUBSCRIBER IN A DIGITAL DOMAIN

(71) Applicant: PROVE IDENTITY, INC., New York, NY (US)

(72) Inventors: Prashant Janakrai Desai, New York, NY (US); David Louis Berra, Arvada, CO (US); Rodger R. Desai, New York, NM (US); Michael Bijelich, New York, NY (US); Jeffrey Robert Naujok, Colorado Springs, CA (US); Michael Stearne, Bellmawr, NJ (US)

(73) Assignee: Prove Identity, Inc., New York, NY (US)

( * ) Notice: Subject to any disclaimer, the term of this patent is extended or adjusted under 35 U.S.C. 154(b) by 109 days.

(21) Appl. No.: 17/565,427

(22) Filed: Dec. 29, 2021

(65) Prior Publication Data
US 2022/0210657 A1    Jun. 30, 2022

Related U.S. Application Data

(60) Provisional application No. 63/133,127, filed on Dec. 31, 2020.

(51) Int. Cl.
*H04W 12/72* (2021.01)
*H04W 12/12* (2021.01)

(52) U.S. Cl.
CPC ........... *H04W 12/72* (2021.01); *H04W 12/12* (2013.01)

(58) Field of Classification Search
CPC .............................. H04W 12/72; H04W 76/12
See application file for complete search history.

(56) References Cited

U.S. PATENT DOCUMENTS

| 5,727,163 A | 3/1998 | Bezos |
| 5,874,918 A | 2/1999 | Czarnecki |

(Continued)

FOREIGN PATENT DOCUMENTS

| EP | 1936528 | 3/2014 |
| JP | H11338933 | 12/1999 |

(Continued)

OTHER PUBLICATIONS

U.S. Appl. No. 16/730,878: Final Office Action dated Mar. 28, 2023, 22 pages, Doc 1889.

(Continued)

*Primary Examiner* — Dao Q Ho
(74) *Attorney, Agent, or Firm* — Husch Blackwell LLP; Bryan D. Stewart; Matthew Francis

(57) ABSTRACT

Briefly, example methods, apparatuses, and/or articles of manufacture are disclosed that may be implemented to represent an identity network corresponding to a communications device subscriber in an electronic or digital domain. The method may include transmitting a message to a communications device. Responsive to the transmitted message, an authenticator may receive a signal to verify that a subscriber having a real-world identity is co-located with the communications device. The method may continue with establishing, in an electronic or digital domain, two or more nodes of an identity network corresponding to aspects of the real-world identity of the subscriber, the identity network being attached to the real-world identity via a persistent identifier, and the two or more nodes of the identity network being linked via one or more relationships.

25 Claims, 10 Drawing Sheets

(56) References Cited

U.S. PATENT DOCUMENTS

| | | |
|---|---|---|
| 5,930,474 A | 7/1999 | Dunworth |
| 6,012,144 A | 1/2000 | Pickett |
| 6,130,937 A | 10/2000 | Fotta |
| 6,134,316 A * | 10/2000 | Kallioniemi ............ H04W 8/28 |
| | | 379/211.02 |
| 6,151,631 A | 11/2000 | Ansell |
| 6,249,252 B1 | 6/2001 | Dupray |
| 6,684,250 B2 | 1/2004 | Anderson |
| 6,748,367 B1 | 6/2004 | Lee |
| 6,757,740 B1 | 6/2004 | Parekh |
| 6,769,030 B1 | 7/2004 | Bournas |
| 6,947,978 B2 | 9/2005 | Huffman |
| 6,968,194 B2 | 11/2005 | Aljadeff |
| 7,100,204 B1 | 8/2006 | Myllymaki |
| 7,194,354 B1 | 3/2007 | Oran |
| 7,587,368 B2 | 9/2009 | Felsher |
| 7,657,522 B1 | 2/2010 | Puzicha |
| 8,136,148 B1 | 3/2012 | Chayanam |
| 8,238,532 B1 | 8/2012 | Cox |
| 8,341,236 B1 | 12/2012 | Ganesan |
| 8,364,758 B2 | 1/2013 | Hydrie |
| 8,438,382 B2 | 5/2013 | Ferg |
| 8,490,168 B1 | 7/2013 | Holloway |
| 8,549,601 B2 | 10/2013 | Ganesan |
| 8,589,459 B1 | 11/2013 | Ganesan |
| 8,589,532 B2 | 11/2013 | Tenny |
| 8,789,153 B2 | 7/2014 | Ganesan |
| 8,806,592 B2 | 8/2014 | Ganesan |
| 9,325,702 B2 | 4/2016 | Ganesan |
| 9,349,014 B1 | 5/2016 | Hubing et al. |
| 9,819,680 B2 | 11/2017 | Grigg |
| 9,870,464 B1 | 1/2018 | Kane-Parry et al. |
| 10,284,549 B2 | 5/2019 | Ganesan |
| 10,454,897 B1 | 10/2019 | Rajanna |
| 10,552,823 B1 | 2/2020 | Woodward |
| 10,581,834 B2 | 3/2020 | Ganesan |
| 10,587,683 B1 | 3/2020 | Ganesan |
| 10,686,781 B1 | 6/2020 | Kaditz et al. |
| 10,771,624 B1 | 9/2020 | Penar |
| 10,824,702 B1 | 11/2020 | Shahidzadeh et al. |
| 2002/0049644 A1 | 4/2002 | Kargman |
| 2002/0069037 A1 | 6/2002 | Hendrickson |
| 2002/0095507 A1 | 7/2002 | Jerdonek |
| 2003/0028451 A1 | 2/2003 | Ananian |
| 2003/0046022 A1 | 3/2003 | Silverman |
| 2003/0092421 A1 | 5/2003 | Dolwin |
| 2003/0093341 A1 | 5/2003 | Millard |
| 2003/0138084 A1 | 7/2003 | Lynam |
| 2003/0157963 A1 | 8/2003 | Collot |
| 2004/0030924 A1 | 2/2004 | Griswold |
| 2004/0030934 A1 | 2/2004 | Mizoguchi |
| 2004/0210536 A1 * | 10/2004 | Gudelj ................. G07F 19/206 |
| | | 705/64 |
| 2004/0225878 A1 | 11/2004 | Costa-Requena |
| 2004/0242238 A1 | 12/2004 | Wang |
| 2005/0018611 A1 | 1/2005 | Chan |
| 2005/0071417 A1 | 3/2005 | Taylor |
| 2005/0135242 A1 | 6/2005 | Larsen |
| 2005/0172229 A1 | 8/2005 | Reno |
| 2005/0254653 A1 | 11/2005 | Potashnik |
| 2006/0168259 A1 | 7/2006 | Spilotro |
| 2006/0168663 A1 | 7/2006 | Viljoen |
| 2006/0206709 A1 | 9/2006 | Labrou |
| 2006/0229996 A1 | 10/2006 | Keithley |
| 2006/0235795 A1 | 10/2006 | Johnson |
| 2006/0239199 A1 | 10/2006 | Blair |
| 2006/0282662 A1 | 12/2006 | Whitcomb |
| 2007/0011312 A1 | 1/2007 | Nakamura |
| 2007/0011724 A1 | 1/2007 | Gonzalez |
| 2007/0060097 A1 * | 3/2007 | Edge ...................... H04W 4/90 |
| | | 455/404.1 |
| 2007/0067828 A1 | 3/2007 | Bychkov |
| 2007/0074276 A1 | 3/2007 | Harrison |
| 2007/0077916 A1 | 4/2007 | Saito |
| 2007/0079135 A1 | 4/2007 | Saito |
| 2007/0094150 A1 | 4/2007 | Yuen |
| 2007/0157304 A1 | 7/2007 | Logan |
| 2007/0167171 A1 | 7/2007 | Bishop |
| 2007/0169174 A1 | 7/2007 | Critten |
| 2007/0174904 A1 | 7/2007 | Park |
| 2007/0186095 A1 | 8/2007 | Ganesan |
| 2007/0198437 A1 | 8/2007 | Eisner |
| 2007/0250920 A1 | 10/2007 | Lindsay |
| 2007/0279227 A1 | 12/2007 | Juels |
| 2007/0283273 A1 | 12/2007 | Woods |
| 2007/0292349 A1 | 12/2007 | Griswold |
| 2007/0300070 A1 | 12/2007 | Shen-Orr |
| 2008/0028447 A1 | 1/2008 | O'Malley |
| 2008/0034216 A1 | 2/2008 | Law |
| 2008/0037536 A1 | 2/2008 | Padmanabhan |
| 2008/0052180 A1 | 2/2008 | Lawhorn |
| 2008/0109657 A1 | 5/2008 | Beiai |
| 2008/0120707 A1 | 5/2008 | Ramia |
| 2008/0137554 A1 | 6/2008 | Nandhra |
| 2008/0167106 A1 | 7/2008 | Lutnick |
| 2008/0172730 A1 | 7/2008 | Sandhu |
| 2008/0182598 A1 | 7/2008 | Bowman |
| 2008/0214153 A1 | 9/2008 | Ramer |
| 2008/0254765 A1 | 10/2008 | Eilaz |
| 2008/0313719 A1 | 12/2008 | Kaliski, Jr. |
| 2009/0083430 A1 | 3/2009 | Edge |
| 2009/0037983 A1 | 4/2009 | Chiruvolu |
| 2009/0093300 A1 | 4/2009 | Lutnick |
| 2009/0106138 A1 | 4/2009 | Smith |
| 2009/0119754 A1 | 5/2009 | Schubert |
| 2009/0119776 A1 | 5/2009 | Painitkar |
| 2009/0132813 A1 | 5/2009 | Schibuk |
| 2009/0222581 A1 | 9/2009 | Josefsberg |
| 2009/0232515 A1 | 9/2009 | Marien |
| 2009/0235339 A1 | 9/2009 | Mennes |
| 2009/0249076 A1 | 10/2009 | Reed |
| 2009/0249077 A1 | 10/2009 | Gargaro |
| 2009/0254572 A1 | 10/2009 | Redlich |
| 2009/0259588 A1 | 10/2009 | Lindsay |
| 2009/0259848 A1 | 10/2009 | Williams |
| 2009/0265768 A1 | 10/2009 | Labaton |
| 2009/0265776 A1 | 10/2009 | Baentsch |
| 2009/0288159 A1 | 11/2009 | Husemann |
| 2009/0307767 A1 | 12/2009 | Semba |
| 2009/0328168 A1 | 12/2009 | Lee |
| 2009/0328173 A1 | 12/2009 | Jakobson et al. |
| 2010/0017860 A1 | 1/2010 | Ishida |
| 2010/0024022 A1 | 1/2010 | Wells |
| 2010/0041391 A1 | 2/2010 | Spivey |
| 2010/0080369 A1 | 4/2010 | Hurst et al. |
| 2010/0128291 A1 | 5/2010 | Vendrow |
| 2010/0131670 A1 | 5/2010 | Ishii |
| 2010/0153540 A1 | 6/2010 | Li |
| 2010/0180328 A1 | 7/2010 | Moas |
| 2010/0235897 A1 | 9/2010 | Mason |
| 2010/0242104 A1 | 9/2010 | Wankmueller |
| 2010/0262834 A1 | 10/2010 | Freeman |
| 2010/0268831 A1 | 10/2010 | Scott |
| 2010/0312703 A1 | 12/2010 | Kulpati et al. |
| 2010/0325427 A1 | 12/2010 | Ekberg |
| 2010/0329125 A1 | 12/2010 | Roberts |
| 2011/0047372 A1 | 2/2011 | Ganesan |
| 2011/0072499 A1 | 3/2011 | Lin |
| 2011/0086616 A1 | 4/2011 | Brand |
| 2011/0151843 A1 | 6/2011 | Deuel |
| 2011/0153496 A1 | 6/2011 | Royyuru |
| 2011/0159848 A1 | 6/2011 | Pei |
| 2011/0161989 A1 | 6/2011 | Russo |
| 2011/0191823 A1 | 8/2011 | Huibers |
| 2011/0206039 A1 | 8/2011 | Lee |
| 2011/0208801 A1 | 8/2011 | Thorkelsson |
| 2011/0231354 A1 | 9/2011 | O'Sullivan |
| 2011/0265149 A1 | 10/2011 | Ganesan |
| 2011/0273551 A1 | 11/2011 | Yang |
| 2011/0287782 A1 | 11/2011 | Ho et al. |
| 2012/0054831 A1 | 1/2012 | Patvarczki |
| 2012/0124651 A1 | 5/2012 | Ganesan |
| 2012/0166598 A1 | 6/2012 | Yuan |
| 2012/0184291 A1 | 7/2012 | Tietsch et al. |

(56) References Cited

U.S. PATENT DOCUMENTS

| | | |
|---|---|---|
| 2012/0192255 A1 | 7/2012 | Ganesan |
| 2012/0202517 A1 | 8/2012 | Edge |
| 2012/0272056 A1 | 10/2012 | Ganesan |
| 2013/0060665 A1* | 3/2013 | Davis .................. H04L 9/40 |
| | | 707/E17.014 |
| 2013/0133086 A1 | 5/2013 | Liberman |
| 2013/0165040 A1 | 6/2013 | Mcintyre |
| 2013/0196685 A1 | 8/2013 | Griff |
| 2013/0232547 A1 | 9/2013 | Ganesan |
| 2013/0282589 A1 | 10/2013 | Shoup |
| 2013/0333006 A1 | 12/2013 | Tapling |
| 2014/0020073 A1 | 1/2014 | Ronda |
| 2014/0189861 A1* | 7/2014 | Gupta .................. H04L 63/08 |
| | | 709/224 |
| 2014/0199962 A1 | 7/2014 | Mohammed |
| 2014/0273965 A1 | 9/2014 | Raleigh |
| 2014/0282870 A1* | 9/2014 | Markwordt ........ G06F 21/31 |
| | | 726/3 |
| 2014/0295886 A1 | 10/2014 | Tickoo |
| 2014/0298432 A1 | 10/2014 | Brown |
| 2014/0317689 A1 | 10/2014 | Mogush |
| 2014/0359722 A1 | 12/2014 | Schultz et al. |
| 2015/0043724 A1 | 2/2015 | Farris |
| 2015/0106955 A1 | 4/2015 | Soelberg et al. |
| 2015/0139407 A1* | 5/2015 | Maguire .............. H04M 3/30 |
| | | 379/22.03 |
| 2015/0156267 A1 | 6/2015 | Zhang |
| 2015/0254672 A1 | 9/2015 | Huesch |
| 2015/0302397 A1 | 10/2015 | Kalgi |
| 2016/0014603 A1 | 1/2016 | Woodward |
| 2016/0036777 A1 | 2/2016 | Bartlett |
| 2016/0112569 A1 | 4/2016 | Timem |
| 2016/0125534 A1 | 5/2016 | Baker |
| 2016/0127370 A1 | 5/2016 | Hettervik |
| 2016/0148597 A1 | 5/2016 | Hamid |
| 2016/0156620 A1 | 6/2016 | Ganesan |
| 2016/0173687 A1 | 6/2016 | Ehrlich |
| 2016/0191494 A1 | 6/2016 | Claes |
| 2016/0255477 A1 | 9/2016 | Parulski |
| 2016/0316341 A1 | 10/2016 | Vaccari |
| 2016/0350751 A1 | 12/2016 | Keys |
| 2017/0078859 A1 | 3/2017 | Kendrick |
| 2017/0085568 A1* | 3/2017 | Rolfe .................. H04L 63/06 |
| 2017/0085635 A1 | 3/2017 | Nicholls |
| 2017/0123069 A1 | 5/2017 | Kotab |
| 2017/0149769 A1 | 5/2017 | Ganesan |
| 2017/0235454 A1 | 8/2017 | Selfridge |
| 2017/0238129 A1* | 8/2017 | Maier .................. H04W 4/029 |
| | | 455/404.2 |
| 2017/0289172 A1 | 10/2017 | Turakhia |
| 2017/0311367 A1 | 10/2017 | Ursitti |
| 2017/0351977 A1 | 12/2017 | Bijor |
| 2017/0352250 A1 | 12/2017 | De Barros Chapiewski |
| 2017/0364911 A1 | 12/2017 | Landrok |
| 2018/0013559 A1 | 1/2018 | Hassan |
| 2018/0212971 A1 | 7/2018 | Costa |
| 2019/0007553 A1 | 1/2019 | Noldus |
| 2019/0080155 A1* | 3/2019 | Ganong .............. G06V 40/167 |
| 2019/0208354 A1 | 7/2019 | Raduchel |
| 2019/0238531 A1 | 8/2019 | Ganesan |
| 2020/0042685 A1 | 2/2020 | Tussy et al. |
| 2020/0167453 A1 | 5/2020 | Bouse |
| 2020/0210988 A1 | 7/2020 | Woodward |
| 2020/0364366 A1* | 11/2020 | Kundu ................ H04L 63/102 |
| 2020/0366671 A1* | 11/2020 | Larson ................ H04L 9/3228 |
| 2020/0382364 A1* | 12/2020 | Kilburn .............. H04M 7/0024 |
| 2021/0044161 A1 | 2/2021 | Kantorowicz |
| 2021/0044616 A1* | 2/2021 | Kantorowicz ........ H04W 12/48 |
| 2021/0058507 A1 | 2/2021 | Cornwell |
| 2021/0105271 A1* | 4/2021 | Nitturkar ............. H04W 12/06 |
| 2021/0168148 A1* | 6/2021 | Boodaei ............. H04L 63/0861 |
| 2022/0012743 A1* | 1/2022 | Snell .................... H04W 12/72 |

FOREIGN PATENT DOCUMENTS

| | | |
|---|---|---|
| JP | 2001175599 A | 6/2001 |
| JP | 2002259344 A | 9/2002 |
| JP | 2003186838 A | 7/2003 |
| JP | 2005209083 A | 8/2005 |
| JP | 2006221440 A | 8/2006 |
| JP | 2007102777 A | 4/2007 |
| JP | 2007328381 A | 12/2007 |
| JP | 2013518348 A | 5/2013 |
| WO | WO2007026486 | 3/2007 |
| WO | WO2007103831 | 9/2007 |
| WO | WO2007107868 | 9/2007 |
| WO | WO2008123461 | 10/2008 |

OTHER PUBLICATIONS

U.S. Appl. No. 17/246,471: Non-Final Office Action dated Apr. 13, 2023, 48 pages, Doc 1890.

U.S. Appl. No. 18/076,074: Filing Receipt & Miscellaneous Communication to Applicant date Dec. 23, 2022, 4 pages, Doc 1891.

PCT Application No. PCT/US2022/052028: Intl Search Report and Written Opinion dated Apr. 13, 2023, 24 pages, Doc 1894.

U.S. Appl. No. 18/185,605: Patent Application filed Mar. 17, 2023, 59 pages, Doc 1892.

Anton—"Kodekey Biometric Authentication System Links Your Identity to Your Phone Number", TECHTHELEAD.com, Jan. 30, 2006, 6 pages, Doc 1212.

Burr—"Maximizing Consumer Contacts while Mitigating TCPA Risk"; Mar. 12, 2014, available at: https:/iwww.neustar.biz/resources/videos/mitigate-tcpa-risk-aml-conections-video, 18 pages, Doc 1215.

Dryburgh, et al.; "Signaling System No. 7 (SS7/C7): Protocol, Architecture, and Services"; Cisco Press, Aug. 2, 2004 available at: http:!itechbus.safaribooksonline.com/book/e?ectrica!-engineerinigicommunicatio1H,e ngi neeri ng/1587050404/introductions-and-overviewsichi.13, 2 pages, Doc 1217.

Federal Communications Commission; "Wireless Local Number Portability (WLNP)—frequently asked questions"; May 18, 2016; available at:https://wireless.fcc.gov/wlnp/documents/wlnpfaqs.pdf, pages, Doc 1214.

Gralla; "How the Internet Works"; 2006; Que, pp. 346-347, Doc 1233.

Gueye—"Constraint-Based Geolocation of Internet Hosts", IEEE/ACM Transactions on Networking, vol. 14, No. 6, Dec. 2006, 14 pages, Doc 1210.

IP2LOCATION—"Identify Geographical Location and Proxy by IP Address", (http://www.ip2location.com), 2001, 6 pages, Doc 1208.

Katz-Bassett—"Towards IP Geolocation Using Delay and Topology Measurements" IMC'06, Oct. 25-27, 2006, Rio de Janeiro, Brazil, 13 pages, Doc 1211.

Malphrus; "Perspectives on Retail Payments Fraud"; Feb. 11, 2009, Economic Perspectives, vol. XXXIII, No. 1, 2009; available at: https://papers.ssrn.comisol3/papers.cfm?abstmct_id:::1341233, 6 pages, Doc 1218.

Padmanabhan—"An Investigation of Geographic Mapping Techniques for Internet Hosts", SIGCOMM'01, Aug. 27-31, 2001, San Diego, CA, 13 pages, Doc 1209.

Quova "How we do it" (http://www.quova.com/what/how-we-do-it/), 2011, 3 pages, Doc 1250.

wiki.gis.com—Geolocation Software (http://en.wikipedia.org/wiki/Geolocation_software), Last Updated May 23, 2011, 4 pages, Doc 1207.

WOT Online; "How to interpret the reputation in reputation icon?"; 2006. Retrieved from http://web. archive. org/web/20061127233933/http://www. mywot. com/en/woUhelp/wot_ symbols_ explained, 3 pages, Doc 1213.

YTD2525—"Enterprise HLR Lookup Portal and API," published May 30, 2014 at blog YTD2525, citing hlr-lookups.com as the source, available at: https://ytd2525.wordpress.com/2014/05/30/enterprise-hlr-lookup-portal-and-api/, 5 pages, Doc 1216.

U.S. Appl. No. 17/031,696: US Patent Application filed Sep. 24, 2020, 65 pages, Doc 1219.

(56) References Cited

OTHER PUBLICATIONS

U.S. Appl. No. 17/031,696: Filing Receipt dated Oct. 14, 2020, 3 pages, Doc 1220.
U.S. Appl. No. 17/031,696: Non-final Office Action dated Sep. 15, 2021, 18 pages, Doc 1221.
U.S. Appl. No. 17/031,696: Response to Office Action filed Jan. 11, 2022, 16 pages, Doc 1222.
U.S. Appl. No. 17/031,696: Final Office Action dated Mar. 16, 2022, 32 pages, Doc 1223.
PCT Application No. PCT/US2020/052580: PCT Application filed Sep. 24, 2020, 58 pages, Doc 1224.
PCT Application No. PCT/US2020/052580: Intl Search Report and Written Opinion dated Dec. 8, 2020, 16 pages, Doc 1225.
PCT Application No. PCT/US2020/052580: Article 34 Amendment filed Mar. 5, 2021, 20 pages, Doc 1226.
PCT Application No. PCT/US2020/052580: Intl Preliminary Report on Patentability mailed Jan. 19, 2022, 20 pages, Doc 1227.
U.S. Appl. No. 15/470,522: Patent Application filed Mar. 27, 2017, 48 pages, Doc 1228A and 1228B.
U.S. Appl. No. 15/470,522: Preliminary Amendment filed Mar. 30, 2017, 8 pages, Doc 1229.
U.S. Appl. No. 15/470,522: Filing Receipt and Notice to File Corrected Application Papers dated Apr. 4, 2017, 5 pages, Doc 1230.
U.S. Appl. No. 15/470,522: Amendment and Response to Notice to File Corrected Application Papers filed Apr. 18, 2017, 53 pages, Doc 1231A and 1231B.
U.S. Appl. No. 15/470,522: Updated Filing Receipt dated Apr. 18, 2017, 3 pages, Doc 1232.
U.S. Appl. No. 15/470,522: Restriction Requirement dated Feb. 4, 2019, 8 pages, Doc 1234.
U.S. Appl. No. 15/470,522: Amendment and Response to Restriction Requirement filed Apr. 1, 2019, 12 pages, Doc 1235.
U.S. Appl. No. 15/470,522: Non-final Office Action dated May 16, 2019, 26 pages, Doc 1236.
U.S. Appl. No. 15/470,522: Amendment filed Aug. 1, 2019, 12 pages, Doc 1237.
U.S. Appl. No. 15/470,522: Notice of Allowance dated Dec. 30, 2019, 8 pages, Doc 1238.
U.S. Appl. No. 15/470,522: Issue Fee Payment filed Dec. 30, 2019, 5 pages, Doc 1239.
U.S. Appl. No. 15/470,522: Issue Notification dated Jan. 15, 2020, 1 page, Doc 1240.
U.S. Appl. No. 16/730,878: Patent Application filed Dec. 30, 2019, 49 pages, Doc 1241A and 1241B.
U.S. Appl. No. 16/730,878: Filing Receipt and Notice to File Corrected Application Papers dated Jan. 24, 2020, 6 pages, Doc 1242.
U.S. Appl. No. 16/730,878: Amendment and Response to Notice to File Corrected Application Papers filed Mar. 24, 2020, 39 pages, Doc 1243A and 1243B.
U.S. Appl. No. 16/730,878: Updated Filing Receipt dated Mar. 26, 2020, 4 pages, Doc 1244.
U.S. Appl. No. 16/730,878: Notice of Publication dated Jul. 6, 2020, 1 page, Doc 1245.
U.S. Appl. No. 16/730,878: Request for Corrected Filing Receipt dated Jul. 9, 2020, 1 page, Doc 1246.
U.S. Appl. No. 16/730,878: Corrected Filing Receipt dated Jul. 13, 2020, 4 pages, Doc 1247.
U.S. Appl. No. 12/938,245: Patent Application filed Nov. 2, 2010, 24 pages, Doc 1248.
U.S. Appl. No. 12/938,245: Filing Receipt dated Nov. 17, 2020, 3 pages, Doc 1249.
U.S. Appl. No. 12/938,245: Preliminary Amendment filed Jan. 10, 2012, 17 pages, Doc 1251.
U.S. Appl. No. 12/938,245: Examiner Initiated Interview Summary and Notice of Allowance dated Jun. 18, 2012, 22 pages, Doc 1252.
U.S. Appl. No. 12/938,245: Issue Fee Payment filed Nov. 8, 2012, 1 page, Doc 1253.
U.S. Appl. No. 12/938,245: Issue Notification dated Dec. 5, 2012, 1 page, Doc 1254.
U.S. Appl. No. 13/669,123: Patent Application filed Nov. 5, 2012, 83 pages, Doc 1255A-D.
U.S. Appl. No. 13/669,123: Filing Receipt and Notice to File Corrected Application Papers dated Dec. 4, 2012, 5 pages, Doc 1256.
U.S. Appl. No. 13/669,123: Amendment and Response to Notice to File Corrected Application Papers filed Jan. 8, 2013, 4 pages, Doc 1257.
U.S. Appl. No. 13/669,123: Updated Filing Receipt dated Aug. 12, 2013, 3 pages, Doc 1258.
U.S. Appl. No. 13/669,123: Notice of Allowance dated Sep. 11, 2013, 10 pages, Doc 1259.
U.S. Appl. No. 13/669,123: Issue Fee Payment filed Oct. 14, 2013, 2 pages, Doc 1260.
U.S. Appl. No. 13/669,123: Issue Notification dated Oct. 30, 2013, 1 page, Doc 1261.
U.S. Appl. No. 13/736,944: Patent Application filed Jan. 9, 2013, 17 pages, Doc 1262.
U.S. Appl. No. 13/736,944: Filing Receipt dated Feb. 6, 2014, 3 pages, Doc 1263.
U.S. Appl. No. 13/736,944: Non-final Office Action dated May 4, 2013, 16 pages, Doc 1264.
U.S. Appl. No. 13/736,944: Response to Non-final Office Action filed Dec. 9, 2015, 12 pages, Doc 1265.
U.S. Appl. No. 13/736,944: Final Office Action dated Oct. 6, 2016, 18 pages, Doc 1266.
U.S. Appl. No. 13/736,944: Request for Continued Examination and Amendment filed Apr. 4, 2017, 14 pages, Doc 1267.
U.S. Appl. No. 13/736,944: Advisory Action dated Apr. 28, 2017, 4 pages, Doc 1268.
U.S. Appl. No. 13/736,944: Request for Continued Examination filed May 1, 2017, 6 pages, Doc 1269.
U.S. Appl. No. 13/736,944: Corrected Filing Receipt dated May 4, 2017, 3 pages, Doc 1270.
U.S. Appl. No. 13/736,944: Replacement Filing Receipt dated May 26, 2017, 3 pages, Doc 1271.
U.S. Appl. No. 13/736,944: Non-final Office Action dated Mar. 21, 2018, 47 pages, Doc 1272A and 1272B.
U.S. Appl. No. 13/736,944: Amendment and Terminal Disclaimer filed Jun. 21, 2018, 42 pages, Doc 1273.
U.S. Appl. No. 13/736,944: Final Office Action dated Oct. 18, 2018, 37 pages, Doc 1274.
U.S. Appl. No. 13/736,944: Response to Final Office Action filed Dec. 17, 2018, 15 pages, Doc 1275.
U.S. Appl. No. 13/736,944: Advisory Action dated Jan. 14, 2019, 6 pages, Doc 1276.
U.S. Appl. No. 13/736,944: Notice of Appealpages, Doc 1277.
U.S. Appl. No. 13/736,944: Appeal Brief filed Mar. 18, 2019, 20 pages, Doc 1278.
U.S. Appl. No. 13/736,944: Notice of Allowance dated Jul. 8, 2019, 19 pages, Doc 1279.
U.S. Appl. No. 13/736,944: Issue Fee Payment filed Oct. 3, 2019, 4 pages, Doc 1280.
U.S. Appl. No. 13/736,944: Issue Notification dated Feb. 19, 2020, 1 page, Doc 1281.
U.S. Appl. No. 15/422, 137: Patent Application filed Feb. 1, 2017, 46 pages, Doc 1282A and 1282B.
U.S. Appl. No. 15/422,137: Filing Receipt and Notice to File Missing Parts dated Feb. 13, 2017, 7 pages, Doc 1283.
U.S. Appl. No. 15/422,137: Response to Notice to File Missing Parts filed Apr. 11, 2017, 6 pages, Doc 1284.
U.S. Appl. No. 15/422, 137: Updated Filing Receipt dated Apr. 14, 2017, 4 pages, Doc 1285.
U.S. Appl. No. 15/422,137: Notice of Publication dated May 25, 2017, 1 page, Doc 1312.
U.S. Appl. No. 15/422,137: Non-final Office Action dated Sep. 20, 2018, 28 pages, Doc 1286.
U.S. Appl. No. 15/422,137: Response to Non-final Office Action filed Dec. 19, 2018, 17 pages, Doc 1313.
U.S. Appl. No. 15/422,137: Applicant Initialed Interview Summary dated Dec. 21, 2018. 4 pages, Doc 1314.

(56) References Cited

OTHER PUBLICATIONS

U.S. Appl. No. 15/422,137: Non-final Office Action dated Apr. 11, 2019, 28 pages, Doc 1315.
U.S. Appl. No. 5/422,137: Response to Non-final Office Action filed Jul. 9, 2019, 15 pages, Doc 1316.
U.S. Appl. No. 15/422,137: Notice of Allowance dated Oct. 25, 2019, 20 pages, Doc 1317.
U.S. Appl. No. 15/422,137: Issue Fee Payment filed Jan. 21, 2020, 3 pages, Doc 1318.
U.S. Appl. No. 15/422,137: Issue Notification dated Feb. 12, 2020, 1 page, Doc 1319.
U.S. Appl. No. 16/790,394: Patent Application filed Feb. 13, 2020, 43 pages, Doc 1300.
U.S. Appl. No. 16/790,394: Filing Receipt and Notice of Missing Parts dated Mar. 3, 2020, 6 pages, Doc 1301.
U.S. Appl. No. 16/790,394: Preliminary Amendment and Response to Notice of Missing Parts filed May 29, 2020, 13 pages, Doc 1302.
U.S. Appl. No. 16/790,394: Updated Filing Receipt dated Jun. 4, 2020, 4 pages, Doc 1303.
U.S. Appl. No. 16/790,394: Request for Corrected Filing Receipt filed Jul. 17, 2020, 1 pages, Doc 1304.
U.S. Appl. No. 16/790,394: Corrected Filing Receipt dated Jul. 21, 2020, 4 pages, Doc 1305.
U.S. Appl. No. 16/790,394: Notice of Publication dated Sep. 10, 2020, 1 page, Doc 1306.
U.S. Appl. No. 16/790,394: Non-final Office Action dated May 17, 2021, 26 pages, Doc 1307.
U.S. Appl. No. 16/790,394: Amendment and Terminal Disclaimer filed Aug. 10, 2021, 22 pages, Doc 1308.
U.S. Appl. No. 16/790,394: Office Action dated Nov. 18, 2021, 31 pages, Doc 1309.
U.S. Appl. No. 16/790,394: Response to Office Action filed Feb. 18, 2022, 16 pages, Doc 1310.
U.S. Appl. No. 16/790,394: Final Office Action dates Apr. 13, 2022, 33 pages, Doc 1311.
U.S. Appl. No. 17/558,570: Patent Application filed Dec. 21, 2021, 80 pages, Doc 1287.
U.S. Appl. No. 17/558,570: Filing Receipt dated Jan. 5, 2022, 4 pages. Doc 1288.
U.S. Appl. No. 17/558,570: Notice of Missing Parts dated Jan. 5, 2022, 2 pages. Doc 1289.
U.S. Appl. No. 17/558,570: Response to Notice of Missing Parts filed Mar. 7, 2022, 6 pages. Doc 1290.
PCT Application PCT/US2021/065112: PCT Application filed Dec. 23, 2021, 67 pages, Doc 1291.
PCT Application PCT/US21/65799: PCT Application filed Dec. 30, 2021, 80 pages, Doc 1296.
U.S. Appl. No. 17/246,471: Patent Application filed Apr. 30, 2021, 73 pages, Doc 1297.
U.S. Appl. No. 17/246,471: Filing Receipt dated May 11, 2021, 4 pages, Doc 1298.
PCT Application PCT/US22/26637: PCT Application filed Apr. 28, 2022, 63 pages, Doc 1299.
U.S. Appl. No. 17/031,696: Notice of Abandonment dated May 26, 2023, 2 pages, Doc 1937.
U.S. Appl. No. 16/730,878: AFCP Request & Response to Final dated May 30, 2023, 20 pages, Doc 1938.
U.S. Appl. No. 16/730,878: Advisory Action dated Jun. 13, 2023, 5 pages, Doc 1939.
U.S. Appl. No. 16/730,878: RCE & Amendment filed Jun. 28, 2023, 23 pages, Doc 1940.
BR Application No. 1120230126002: Brazil Application filed Jun. 22, 2023, 107 pages, Doc 1941.
CA Application No. 3202486: Canada Application filed Jun. 15, 2023, 2 pages, Doc 1942.
EP Application No. 21912241.3: European Application filed Jun. 15, 2023, 6 pages, Doc 1943.
EP Application No. 21912241.3: Rule 161-162 Communication dated Aug. 1, 2023, 3 pages, Doc 1944.
IN Application No. 202347042104: India Application filed Jun. 23, 2023, 65 pages, Doc 1945.
BR Application No. 1120230131685: Brazil Application filed Jun. 29, 2023, 120 pages, Doc 1946.
CA Application No. 3202488: Canada Application filed Jun. 15, 2023, 2 pages, Doc 1947.
EP Application No. 21916545.3: European Application filed Jun. 15, 2023, 6 pages, Doc 1948.
EP Application No. 21916545.3: Rule 161-162 Communication dated Aug. 8, 2023, 3 pages, Doc 1949.
IN Application No. 202347042972: India Application filed Jun. 27, 2023, 78 pages, Doc 1950.
U.S. Appl. No. 18/076,074: Notice of Publication dated Jun. 8, 2023, 1 page, Doc 1951.
PCT Application No. PCT/US2021/065799: International Search Report and Written Opinion dated May 5, 2022, 24 pages, Doc 1830.
PCT Application No. PCT/US2022/26637: International Search Report and Written Opinion dated Jul. 18, 2022, 24 pages, Doc 1829.
U.S. Appl. No. 17/558,570: Notice of Publication dated Jun. 23, 2022, 1 page, Doc 1832.
U.S. Appl. No. 17/565,427: Notice of Publication dated Jun. 30, 2022, 1 page, Doc 1831.
U.S. Appl. No. 17/031,696: Response to Final Office Action filed May 6, 2022, 18 pages, Doc 1349.
U.S. Appl. No. 17/031,696: Advisory Action dated May 13, 2022, 3 pages, Doc 1350.
U.S. Appl. No. 17/031,696: Rce & Response to Final Office Action filed Jun. 6, 2022, 20 pages, Doc 1865.
U.S. Appl. No. 17/031,696: Non-final Office Action dated Jun. 20, 2022, 21 pages, Doc 1866.
U.S. Appl. No. 17/031,696: Response to Non-Final Office Action filed Sep. 9, 2022, 15 pages, Doc 1867.
U.S. Appl. No. 17/031,696: Non-final Office Action dated Nov. 18, 2022, 39 pages, Doc 1863.
U.S. Appl. No. 16/730,878: Non-final Office Action dated Sep. 22, 2022, 38 pages, Doc 1848.
PCT Application No. PCT/US2021/065112: International Search Report and Written Opinion dated Mar. 22, 2022, 24 pages, Doc 1847.
U.S. Appl. No. 17/246,471: Notice of Publication date Nov. 3, 2022, 1 page, Doc 1864.
PCT Application No. PCT/US2021/065112: Response to Written Opinion filed Oct. 21, 2022, 7 pages, Doc 1877.
PCT Application No. PCT/US2021/065799: Demand & Response to Written Opinion filed Oct. 28, 2022, 30 pages, Doc 1878.
U.S. Appl. No. 16/730,878: Response to Non-Final Office Action filed Dec. 19, 2022, 17 pages, Doc 1872.
U.S. Appl. No. 18/076,074, filed Dec. 6, 2022, 64 pages, Doc 1879.
PCT Application No. PCT/US2022/052028: PCT Application filed Dec. 6, 2022, 63 pages, Doc 1868.

\* cited by examiner

IDENTITY NETWORK REPRESENTATION OF COMMUNICATIONS DEVICE SUBSCRIBER IN A DIGITAL DOMAIN

CROSS-REFERENCE TO RELATED APPLICATIONS

This application claims priority to U.S. provisional patent application Ser. No. 63/133,127, filed Dec. 31, 2020, which is incorporated by reference in its entirety and for all purposes.

BACKGROUND

1. Field

The present disclosure relates generally to electronic and/or communication infrastructures and, more particularly, to the formation and electronic storage, in an electronic or digital domain, of a subscriber's real-world identity via an identity network.

2. Information

The World Wide Web or simply the Web, as enabled by Internet computing, routing, and/or wireless transmission resources, has grown rapidly in recent years at least partially in response to the relative ease with which a wide variety of transactions can be performed or enabled via the Internet. As a consequence of widely available Internet connections, including connections to the Internet facilitated by wireless mobile communication services, for example, a mobile subscriber may shop and/or purchase virtually any product or service utilizing a handheld communications device. However, in such an environment, in which electronic, Internet-based commerce has become increasingly common, occurrences of fraud and deception, unfortunately, can also occur.

In addition to facilitating communications among devices having a primary purpose that relates to providing communication services, such as mobile cellular communications devices, the Web also facilitates communication among devices providing other functionalities, such as appliances, industrial, commercial, and household machines, control devices, sensors, etc. In such environments, which include an "Internet of things" (IOT) environment, as well as environments involving devices designed primarily for communications, instances of fraud and deception may bring theft of financial assets, intrusion by unauthorized parties into a user's home network, theft of privileged content, financial and/or credit fraud, and so forth. To reduce a likelihood of fraud, theft, or intrusion by unauthorized parties, fraud-detection and/or user authentication processes may be implemented. Thus, it may be appreciated that reduction in the instances of fraud and deception, which may involve, for example, use of various types of communications devices, continues to be an active area of investigation.

SUMMARY

A general embodiment may be directed to, a method may include transmitting a message to a communications device. The method also may also include receiving a signal, in response to the transmitted message, to verify that a subscriber having a real-world identity is co-located with the communications device. The method also may also include establishing, in an electronic or digital domain, two or more nodes of an identity network corresponding to aspects of the real-world identity of the subscriber, the identity network being attached to the real-world identity via a persistent identifier, and the two or more nodes of the identity network being linked via one or more relationships.

In a particular embodiment, the method may further include establishing one or more additional nodes of the identity network responsive to electronically determining an aspect of the electronic or digital domain corresponding to the subscriber, the aspect including one or more of an electronic mail address of the real-world identity, an internet protocol address of the real-world identity, a wireline telephone number of the real-world identity, an identifier of an ancillary device, an institutional account in the name of the real-world identity, a healthcare account, or a transaction account of the real-world identity. In a particular embodiment, the method may further include establishing one or more additional relationships between or among the one or more nodes of the identity network responsive to one or more electronically determined events that occur with respect to the real-world identity. In a particular embodiment, the one or more electronically determined events correspond to one or more interactions between the real-world identity and the electronic mail address of the real-world identity, the internet protocol address of the real-world identity, the wireline telephone number of the real-world identity, the identifier of the ancillary device, the institutional account of the real-world identity, the healthcare account, and/or the transaction account in the name of the real-world identity. In a particular embodiment, the method may further include assigning a confidence score to the real-world identity in the electronic or digital domain. In a particular embodiment, the method may further include revising the confidence score based, at least in part, on the one or more interactions between the real-world identity and the electronic mail address of the real-world identity, the internet protocol address of the real-world identity, the wireline telephone number of the real-world identity, the identifier of the ancillary device, the institutional account of the real-world identity, and/or the transaction account in the name of the real-world identity. In a particular embodiment, the confidence score is based, at least in part, on one or more deterministic events with respect to the communications device. In a particular embodiment, the method may further include accessing a data store to detect one or more deterministic events in relation to historical norms with respect to the communications device corresponding to the real-world identity. In a particular embodiment, the one or more deterministic events correspond to an online event, and the online event includes one or more of a reassignment of a subscriber account identifier from a first communication services carrier to a second communication services carrier, a purchase or replacement of the communications device, a removal and/or replacement of a subscriber identity module, and a password reset of the communications device. In a particular embodiment, the method may additionally include revising the two or more nodes of the identity network to exclude the persistent identifier. In a particular embodiment, the method may additionally include grouping the two or more nodes and one or more additional nodes of the identity network into one or more relationship groups, the one or more relationship groups including a content group, a transactions group, a financial group, a family group, a household group, a group associated with a physical address of the subscriber, a social network group, and a merchant group. Implementations of the described techniques may include hardware, a method or process, or computer software on a computer-accessible medium.

Another general embodiment may be directed to an apparatus that includes at least one processor coupled to at least one memory device to transmit a message to a communications device. The apparatus may additionally receive a signal, in response to the transmitted message, to verify that a subscriber having a real-world identity is co-located with the communications device. The apparatus may additionally establish, in an electronic or digital domain, two or more nodes of an identity network to correspond to aspects of the real-world identity of the subscriber, the identity network is to be attached to the real-world identity via a persistent identifier, and the two or more nodes of the identity network are to be linked via one or more relationships.

In particular embodiments, the persistent identifier includes a subscriber-unique alias. In particular embodiments, the at least one processor coupled to the at least one memory device are additionally to establish one or more additional nodes of the identity network responsive to an electronic determination of an aspect of the electronic or digital domain corresponding to the subscriber, in which the aspect includes one or more of an electronic mail address of the real-world identity, an internet protocol address of the real-world identity, a wireline telephone number of the real-world identity, an identifier of an ancillary device, an institutional account in the name of the real-world identity, a healthcare account, or a transaction account of the real-world identity. In particular embodiments, the at least one processor coupled to the at least one memory device are additionally to establish one or more additional relationships between or among the one or more nodes of the identity network responsive to one or more electronically determined events that occur with respect to the real-world identity. Particular embodiments may also include the one or more electronically determined events correspond to one or more interactions between the real-world identity and the electronic mail address of the real-world identity, the internet protocol address of the real-world identity, the wireline telephone number of the real-world identity, the identifier of the ancillary device, the institutional account of the real-world identity, the healthcare account, and/or the transaction account in the name of the real-world identity. In particular embodiments, the apparatus is additionally to assign a confidence score to the real-world identity in the electronic or digital domain. In particular embodiments, the apparatus is additionally to revise the confidence score based, at least in part, on the one or more interactions between the real-world identity and the electronic mail address of the real-world identity, the internet protocol address of the real-world identity, the wireline telephone number of the real-world identity, the identifier of the ancillary device, the institutional account of the real-world identity, and/or the transaction account in the name of the real-world identity. In particular embodiments, the apparatus is further to access a data store to detect one or more deterministic events in relation to historical norms with respect to the communications device corresponding to the real-world identity. In particular embodiments, the one or more deterministic events correspond to an online event. In particular embodiments, the online event includes one or more of a reassignment of a subscriber account identifier from a first communication services carrier to a second communication services carrier, a purchase or replacement of the communications device, a removal and/or replacement of a subscriber identity module, and a password reset of the communications device. Implementations of the described techniques may include hardware, a method or process, or computer software on a computer-accessible medium.

Another general embodiment may be directed to an article including a non-transitory storage medium having instructions stored thereon which, when executed by a special-purpose computing platform having processor coupled to at least one memory device are operable to transmit a message to a communications device and to receive a signal, in response to the transmitted message, to verify that a subscriber having a real-world identity is co-located with the communications device. The processor coupled to the at least one memory device may also establish, in an electronic or digital domain, two or more nodes of an identity network to correspond to aspects of the real-world identity of the subscriber, wherein the identity network is to be attached to the real-world identity via a persistent identifier, and the two or more nodes of the identity network are to be linked via one or more relationships.

In particular embodiments, the stored instructions may revise two or more nodes of the identity network to exclude the persistent identifier. In particular embodiments, the stored instructions are additionally to direct the at least one processor coupled to the at least one memory device to establish one or more additional nodes of the identity network responsive to an electronic determination of an aspect of the electronic or digital domain corresponding to the subscriber, in which the aspect may include one or more of: an electronic mail address of the real-world identity, an internet protocol address of the real-world identity, a wireline telephone number of the real-world identity, an identifier of an ancillary device, an institutional account in the name of the real-world identity, a healthcare account, or a transaction account of the real-world identity. In particular embodiments, the stored instructions are additionally to direct the at least one processor coupled to the at least one memory device to establish one or more additional relationships between or among the one or more nodes of the identity network responsive to one or more electronically determined events that occur with respect to the real-world identity. In particular embodiments, the one or more electronically determined events correspond to one or more interactions between the real-world identity and the electronic mail address of the real-world identity, the internet protocol address of the real-world identity, the wireline telephone number of the real-world identity, the identifier of the ancillary device, the institutional account of the real-world identity, the healthcare account, and/or the transaction account in the name of the real-world identity. In particular embodiments, the stored instructions are additionally to direct the at least one processor coupled to the at least one memory device to assign a confidence score to the real-world identity in the electronic or digital domain. In particular embodiments, the stored instructions are additionally to revise the confidence score based, at least in part, on the one or more interactions between the real-world identity and the electronic mail address of the real-world identity, the internet protocol address of the real-world identity, the wireline telephone number of the real-world identity, the identifier of the ancillary device, the institutional account of the real-world identity, and/or the transaction account in the name of the real-world identity. In particular embodiments, the stored instructions are additionally to direct the at least one processor coupled to the at least one memory device to access a data store to detect one or more deterministic events in relation to historical norms with respect to the communications device corresponding to the real-world identity. In particular embodiments, the one or more deterministic events correspond to an online event. In particular embodiments, the online event includes one or more of a reassignment of a subscriber account identifier from a first communication services carrier to a second communication services carrier, a purchase or replacement of the communications device, a removal and/or replacement of a subscriber identity module (sim), and a password reset of the communications device.

BRIEF DESCRIPTION OF THE DRAWINGS

Claimed subject matter is particularly pointed out and distinctly claimed in the concluding portion of the specification. However, both as to organization and/or method of operation, together with objects, features, and/or advantages thereof, claimed subject matter may best be understood by reference to the following detailed description if read with the accompanying drawings in which:

Figure 1:
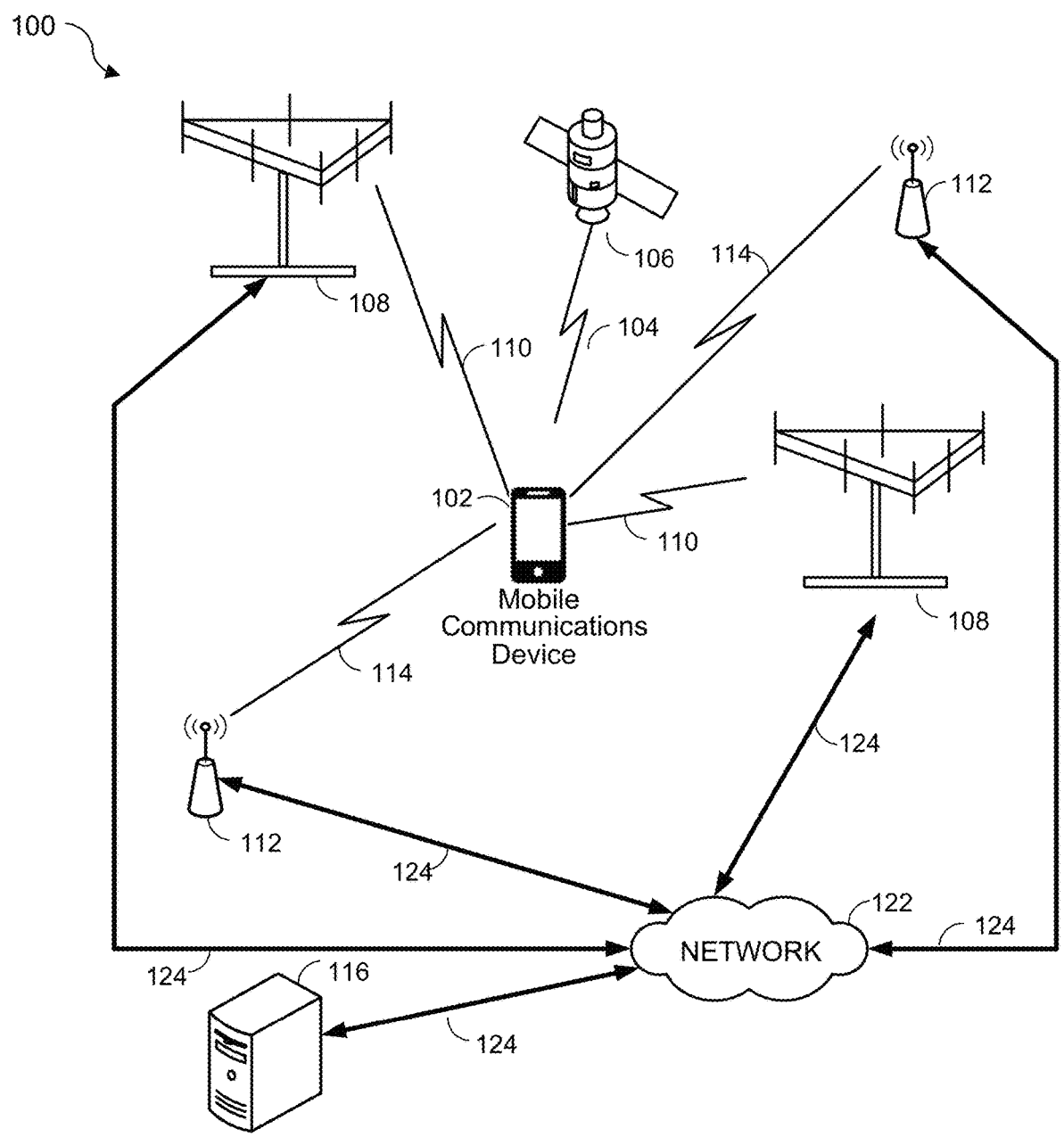
FIG. 1 is a diagram illustrating features associated with an implementation of an example communications infrastructure, which may facilitate an identity verification platform to establish a tie between a subscriber's real-world and digital identity, according to an embodiment.

Reference is made in the following detailed description to accompanying drawings, which form a part hereof, wherein like numerals may designate like parts throughout that are corresponding and/or analogous. It will be appreciated that the figures have not necessarily been drawn to scale, such as for simplicity and/or clarity of illustration. For example, dimensions of some aspects may be exaggerated relative to others, one or more aspects, properties, etc. may be omitted, such as for ease of discussion, or the like. Further, it is to be understood that other embodiments may be utilized. Furthermore, structural and/or other changes may be made without departing from claimed subject matter. References throughout this specification to "claimed subject matter" refer to subject matter intended to be covered by one or more claims, or any portion thereof, and are not necessarily intended to refer to a complete claim set, to a particular combination of claim sets (e.g., method claims, apparatus claims, etc.), or to a particular claim. It should also be noted that directions and/or references, for example, such as up, down, top, bottom, and so on, may be used to facilitate discussion of drawings and are not intended to restrict application of claimed subject matter. Therefore, the following detailed description is not to be taken to limit claimed subject matter and/or equivalents.

DETAILED DESCRIPTION

References throughout this specification to one implementation, an implementation, one embodiment, an embodiment, and/or the like means that a particular feature, structure, characteristic, and/or the like described in relation to a particular implementation and/or embodiment is included in at least one implementation and/or embodiment of claimed subject matter. Thus, appearances of such phrases, for example, in various places throughout this specification are not necessarily intended to refer to the same implementation and/or embodiment or to any one particular implementation and/or embodiment. Furthermore, it is to be understood that particular features, structures, characteristics, or the like described are capable of being combined in various ways in one or more implementations and/or embodiments and, therefore, are within intended claim scope. In general, of course, for the specification of a patent application, these and other issues have a potential to vary in a particular context of usage. In other words, throughout the disclosure, particular context of description and/or usage provides helpful guidance regarding reasonable inferences to be drawn; however, likewise, "in this context" in general without further qualification refers at least to the context of the present patent application.

Some example methods, apparatuses, and/or articles of manufacture are disclosed herein that may be used, in whole or in part, to facilitate and/or support one or more operations and/or techniques for implementing an identity verification platform, such as via one or more computing and/or communication networks and/or protocols (e.g., network protocols) discussed herein. As will be seen, in some instances, operations and/or techniques for implementing an identity verification platform, may be implemented, at least in part, to authenticate and/or verify an identity and/or trustworthiness of a subscriber having an account, for example, with a mobile communication services provider.

In this context, an "account," such as described hereinabove, may represent an aspect of an subscriber's presence in an electronic or domain. Accordingly, in a manner similar to the manner in which a real-world subscriber may possess particular physical aspects, such as biometric aspects, which may include height, weight, hair color, eye color, parameters extracted from an image of a subscriber's face (e.g., so as to facilitate facial recognition), a unique fingerprint or thumbprint, a unique walking stride or gait, a subscriber may possess aspects in an electronic or digital domain. For example, in an electronic or digital domain, a subscriber may possess aspects, such as a subscriber account identifier (e.g., mobile or landline telephone number), a persistent identifier or a subscriber-unique alias that associates or couples a subscriber to a communications device, one or more email addresses, one or more bank account numbers or identifiers with performing other types of transactions, healthcare records, one or more brokerage account numbers, a Social Security number, a username and password to obtain restricted or premium content, a media access control (MAC) address, an Internet protocol (IP) address, etc. It should be noted that claimed subject matter is intended to embrace any record that is assignable to a real-world entity, such as an individual subscriber or to a persona representing an individual subscriber.

As also discussed below, one or more operations and/or techniques for implementing an identity verification platform within an electronic infrastructure may permit a particular institution or organization, such as a bank to verify identity and/or trustworthiness of a user. Such verification may be achieved by utilizing sensitive content or data held by a particular data source, such as a communication services provider, a communications device (e.g., a mobile cellular telephone, and IOT device, a laptop computer), or the like. In addition, such identity verification may be achieved via accessing a data source that includes subscriber-specific parameters and/or identifiers such as subscriber names, subscriber physical addresses, social network groups of which a subscriber may be a member, subscriber employers, members of a subscriber's family, members of a subscriber's household, and a host of additional parameters and/or identifiers. In this context, "data source" refers to a source of content, which may include private consumer content, personally identifiable information, premium entertainment content, etc.

As alluded to previously, in a society in which electronic commerce, facilitated via communications devices (e.g. mobile communications devices), takes place on a grand scale, occurrences of fraud, unfortunately, are increasing in frequency and number. Such fraud may occur in connection with everyday transactions, which may include financial fraud, false transactions, theft of funds, purchases with stolen credit cards, and so forth. To reduce the likelihood of such fraud, various anti-fraud procedures may be implemented to preclude all types of fraud, which may include fraud associated with online transactions and/or in-store purchases involving all types of goods and/or services. Likewise, in a world in which various electronic devices typically used for communication, such as wireline telephones, mobile cellular telephones, tablets, laptop computers, etc., are ubiquitous, the types of possible fraud have, in at least some instances, become more complex. Occurrences of fraud may involve the use and/or knowledge of complex technology, for example, which may be related to the particular hardware and/or software platforms associated with such cellular telephones, tablets, laptop computers, etc.

In other instances, fraud may occur via an electronic impersonation of a real-world identity (e.g., a fictitious subscriber) utilizing a "bot," which refers to a computer-instantiated impersonated real-world entity. Additional instances of fraud may include reputational fraud, in which an entity posts false-negative or false-positive reviews on a popular review site, thus providing a source of misinformation that may be disseminated among large groups of people. In other instances, peer-to-peer fraud may occur, in which a "bot," for example, may post fake positive or negative reviews on user review sites for service providers offering vehicles for hire, food delivery, package delivery, couriers, freight transportation, etc. In still other instances, fraud may occur by way of audience manipulation, such as an audience of a social network site, for example, by creating fake accounts, posing as a member of a social networking community, posting false accounts of incidents which may never have occurred, etc. Thus, for numerous reasons, ways to combat fraud, including, but not limited to the above-identified fraudulent behaviors that may occur online and/or electronically, continues to be an active area of investigation.

One approach toward reducing the risk of potential fraud relates to identity authentication and/or verification of a user, customer, subscriber, or purchaser, typically prior to completion of a transaction (e.g., in place of or in addition to) a typical log-in. In this context, the term "transaction" (or similar term) refers to a set of communications and/or actions that take place between at least two parties that reciprocally affect and/or influence the parties involved in the transaction. Entities that provide identity verification services are referred to herein are as "identity verifiers," identity verification services," or utilizing similar terms. For example, an agent (e.g., a financial institution, a content provider, healthcare provider, and employment service, etc.) may include an entity that facilitates and/or supports an identity verification service. An agent may function to organize and/or participating in one or more transactions between two other parties (e.g., a bank and a telecommunication services carrier, etc.). In this context, it is to be understood that identity verification may be requested for a significant number of users for a corresponding number of possible situations. For example, millions, tens of millions, hundreds of millions or even more requests for identity verification may be submitted on a daily basis, for example. Therefore, it may be desirable to implement consistent and repeatable approaches and/or processes that can be utilized in connection with a large volume of identity verification requests, rather than uniquely customized approaches and/or processes that may vary on a request-by-request basis.

As will be discussed, identity verification is an possible approach to reduce the risk of fraud. Other approaches, such as approaches to authentication and/or verification may also be used herein, in whole or in part, such as a part of, in addition to, and/or in conjunction with identity verification. With respect to identity verification, in a worldwide electronic communications environment, a subscriber of a communication services carrier (e.g., a mobile communication services carrier) may establish an identity with such a carrier and/or with a third party. Such third parties may include, but are not limited to, an online merchant, who may be willing to interact with a user (e.g., customer, subscriber, purchaser, etc., to sell, extend services, provide access to content, etc.) if an identity is to be verified. In many instances, given the nature of certain transactions, especially in a communications environment in which transactions take place via a communications network around the clock and at geographically dispersed locations, it may be useful to perform identity verification relatively quickly, such as in a real-time (or near real time) fashion.

As a general matter, authentication and/or verification of a subscriber (e.g., mobile subscriber) may be desirable in response to an institution or organization (e.g., third party, etc.) seeking to verify the identity of a user (e.g., mobile subscriber). In conventional approaches, identity verification tends to rely on authenticating or verifying an existing tie and/or association to a persistent mobile identifier, as demonstrated below through illustrative examples. In this context, the term "bind," "association," or similar terms, refer to a persistent, continuing and objectively verifiable relationship between a user (e.g., subscriber, person, entity, etc.) and an electronic or digital identity, including, as an example, a subscriber and a bank or other financial institution or organization holding or curating the subscriber's bank account. Thus, a "subscriber account identifier," "persistent identifier," or "subscriber-unique alias," may be employed to represent a real-world identity in an electronic or digital domain. In this context, the term "subscriber account identifier" refers to an identifier that relies on account relationship (also referred to as a tie and/or association) between a subscriber and a communication services carrier. In some instances, a "subscriber account identifier" refers to a mobile (or wireline) telephone number. On the other hand, a "persistent identifier" or a "subscriber-unique alias" refer to an identity that indicates a relationship between a subscriber and an identity verifier. Thus, responsive to a particular subscriber severing an account relationship with a first communication services carrier and establishing a relationship with a second communication services carrier, the second communication services carrier may electronically assign a new subscriber account identifier to the subscriber. However, throughout transitions between communication services carriers, an identity verifier may continue to identify and/or refer to the subscriber via a "persistent identifier" or a "subscriber-unique alias."

Other aspects of subscriber authentication and/or verification are described herein. As noted, in an embodiment, verification, such as mobile subscriber identity verification, may relate to a mobile account and/or a mobile subscriber, for example. As mentioned, a mobile account is one example of a type of account, especially in an online world, although claimed subject matter is not intended to be limited to online accounts or to mobile accounts. Rather, the term "account" in this context refers to a formal business arrangement between an entity and/or person and a provider of the account in order to accomplish a business purpose. It is noted, for clarification, that in some situations, a person may represent an entity, for example. Likewise, in some situations, a person and an entity may be distinct. Further, the term account is to be read broadly and may include a service account, a financial account, an account relating to access to content, an account relating to one or more health care providers, an account relating to a government or administrative entity, just to name a few illustrative examples. Thus, continuing with non-limiting examples, an account identifier, in various embodiments, may, for example, be employed with respect to purchase of goods and/or services, access to content, access to financial accounts, access to medical records, access to corporate or organizational intellectual property and/or other types of records and/or files, access to other services, etc. in this context, an account identifier refers to a user-assigned or entity-assigned combination of one or more alphanumeric terms or other symbols, which allows access to a system or to content in an electronic digital domain.

In addition to a subscriber account identifier, a persistent identifier, and a subscriber-unique alias referring to a particular communications device, such terms may additionally refer to a particular communications device. Such communication devices may also be identified via a telephone number (e.g., a mobile telephone number), an international mobile subscriber identifier (IMSI), Integrated Circuit Card Identifier (ICC ID), and/or other type of identifier (e.g., a unique identifier) employed in connection with the particular mobile network operator or the mobile communication services provider. Mobile communications networks may include those compatible or compliant with a Global System for Mobile Communications (GSM) telecommunications network, for example. Other examples of mobile subscriber account identifiers may include an international mobile equipment identifier (IMEI), a mobile equipment identifier or any other identifier including a mobile billing account number or identifier.

Although the discussion that follows relates to any type of account, as a non-limiting illustration, mobile accounts are used for illustration. It is understood, of course, that claimed subject matter is intended to not be limited to examples provided primarily for purposes of illustration, since such examples may be oversimplified for purposes of comprehension, for example. As was mentioned previously, with respect to commerce, including, of course, mobile accounts, a risk of fraud and/or unauthorized actions taking place is present or at least a risk exists of attempts being made.

The following provides a few illustrative examples of accounts in which a risk of fraud and/or unauthorized actions may be present. In scenarios, user may log into a bank account via a web browser or an executable application on a communications device (e.g., a mobile communications device), for example. In response to receipt of signals initiated by the user, a financial institution, for example, may utilize an application programming interface (API) substantially compatible and/or substantially compliant with HTTP and/or HTTPS, including versions now known and/or to be later developed, and/or another suitable protocol (e.g., now known and/or to later be developed). In such an example, a user may seek to take one or more actions with respect to an account, for example, to transfer funds, view a history of transactions, make a payment, update sensitive content, access or update subscriber-specific parameters, etc. In another illustration, a mobile communication services subscriber may seek to access an existing account with a merchant. In response, a merchant, such as a provider of online music or other provider of entertainment-related content, may seek a form of payment, such as via a credit account (e.g., credit card) that may already be on record with the merchant. In another illustration, a user may seek to access a communications device, for example, to create, share, and/or edit a file.

Thus, as suggested, a communication services subscriber (e.g., a mobile communication services subscriber) may seek to access, for example, an online account. A third party, such as those who may provide access to such an accounts, may seek to provide access control so as to restrict access to sensitive content. In an example, a software company and/or product, such as a developer of tax-preparation software products, may permit subscriber (access controlled) user accounts to be established. In another instance, a user may desire to access content, such as content corresponding to sensitive content (e.g., provided by a user to a social media account). In another instance, a user may return to a website and/or application, in which access to the website could be dependent, at least partially, on binding a user to a website and/or with an application, such as via an subscriber account identifier for the user. Thus, a third party may comprise a customer care facility of an enterprise, for example, such as a customer-care facility of a bank, in which an account is established and/or maintained.

As previously mentioned herein, authenticating and/or verifying a subscriber of a communications device may be instrumental in reducing the risk of fraudulent behavior, such as credit card fraud, wire fraud, bank fraud, and so forth. To increase the likelihood that a legitimate, bona fide mobile subscriber can complete a transaction (e.g., a financial transaction, a transaction to obtain fee-based content, or other type of transaction), an identity verifier may query one or more databases. Parameters obtained from the one or more databases may be utilized to complement parameters supplied by, for example, the mobile subscriber, and/or a communications device. In particular embodiments, a communications device may store physical parameters of a subscriber, such as subscriber-specific biometric aspects, which may include height, weight, hair color, eye color, parameters extracted from an image of a subscriber's face (e.g., so as to facilitate facial recognition), a unique fingerprint or thumbprint, a unique walking stride or gait, etc. Subscriber-specific physical parameters may be stored in a protected memory area of a subscriber's communications device, which may facilitate identification of the subscriber. Identity of a subscriber, obtained via accessing a protected area of the communications device may be utilized to generate a tokenized digital signature. In particular embodiments, a tokenized digital signature may facilitate completion of an authentication process initiated by an identity verifier in response to an authentication request generated by a merchant, financial institution, premium content provider, or the like.

It should be noted, however, that in many instances, databases utilized by identity verifiers and/or authenticators may be only partially complete. Accordingly, in some instances, authenticating and/or verifying the identity of a mobile subscriber may be successful in only a limited number of circumstances. Such limited success in authenticating and/or verifying an identity of a mobile subscriber may be attributed, at least in part, to use of imprecise (e.g., "fuzzy") logic. Utilizing fuzzy logic, minor inconsistencies between subscriber parameters may be ignored, so long as, on balance, such subscriber parameters are likely to correspond to a particular subscriber. In one possible example just for the sake of illustration, a first subscriber named John Smith, living in New York City, may be confused with Jonathan Smith, living in a suburb of New York City. In another possible example, two or more parameters, considered in the aggregate, may bring about confusion and/or ambiguity in authentication and/or verification of a subscriber. For example, a first subscriber named John Smith, having a physical address in New York City, and having a Social Security number of 556-55-5555 may be confused with John Smyth, also having a physical address in New York City, and having a Social Security number of 555-55-5555. In such instances, wherein distinct subscribers in the real world may be confused with one another, permitting such subscribers to engage in transactions, such as financial transactions, may be indicative of an opportunity to engage in fraudulent behavior. For example, an unscrupulous individual, may attempt to impersonate a particular subscriber, such as by obtaining a phone number having digits that are similar to those of the subscriber, obtaining an electronic mail address that is similar to an electronic mail address of another subscriber, and so forth.

As mentioned previously, one approach toward mitigation of the risk of fraud may be to employ authentication and/or verification, which may include a tie identity authentication or verification of trustworthiness of a communication services subscriber. In particular embodiments, as will be described herein, an identity verification platform may permit an institution or organization, such as a financial institution, to verify identity and/or trustworthiness of a user by using sensitive content (e.g., personally identifiable information) held by a particular data source. Authentication and/or verification of a subscriber (e.g., a mobile subscriber) may operate to form a tie between the subscriber, which may be represented in an electronic or digital domain. Such a tie may indicate the presence of a relatively strong bond or relationship between the identity of a real-world subscriber and the digital identity of such subscriber (in an electronic or digital domain).

Such a tie between a real-world subscriber and a digital identity of such subscriber in an electronic or digital domain may be relatively strong since many subscribers find it difficult to participate in contemporary society in the absence of certain types of communications devices, such as communications devices. For example, in many instances, certain types of communications devices, such as mobile communications devices, provide not only voice/data communications capabilities, but may also provide location services, calendaring services, entertainment, gaming, social networking, as selected by the subscriber. Accordingly, in contrast to the loss of a particular credit card, a driver's license, or a passport, for example, which may go unnoticed for a period of days or even weeks, loss of a communications device may be noticed immediately, perhaps within minutes or even seconds of misplacement or loss of device. Hence, it may be appreciated that if an subscriber misplaces a communications device, such a subscriber may rapidly attempt to recover the device, or may replace the device immediately.

Accordingly, certain types of communication devices may be instrumental in providing a tie between a real-world subscriber and a digital identity of such a subscriber (e.g., in an electronic or digital domain). Further in view of the importance that many subscribers place on personal mobile communications devices, establishing a tie between an subscriber's real-world identity and such a communications device may tie the identity of a real-world subscriber to an electronic or digital identity of such subscriber. For example, in an electronic or digital domain, a subscriber account identifier (e.g., a mobile telephone number) may be tied to a particular email address, such as an email address to which invoices for communication services may be conveyed. Accordingly, upon establishing a relationship between a real-world subscriber and a digital identity, such as by way of tying a real-world subscriber with a subscriber account number in an electronic or digital domain, additional aspects of the subscriber's digital identity may be constructed. Thus, in one possible example, following the electronic determination of a tie between a real-world subscriber and a subscriber account identifier as well as an email address, an Internet protocol (IP) address to which such emails may be delivered may also be ascertained. Thus, it may be appreciated that the tie between a real-world subscriber and a digital identity of such an subscriber may serve as a conduit, which can be exploited to construct or form additional aspects the subscriber's digital identity may be constructed.

In particular embodiments, such exploitation of a conduit formed between an subscriber's real-world identity and the subscriber's digital identity, utilizing a subscriber account identifier (e.g., a mobile telephone number) may be facilitated utilizing an identity verification platform. In particular embodiments, an identity verification platform may operate within a communications infrastructure, such as shown in FIG. 1.

FIG. 1 is a diagram illustrating features associated with an implementation of an example communications infrastructure, which may facilitate an identity verification platform to establish a tie between a subscriber's real-world and digital identity, according to an embodiment. Processes and/or operations for an identity verification platform may be implemented, at least in part, to validate identity of a communication services subscriber utilizing, for example, a communications device referenced herein at 102. As used herein, "communications device" may refer to any kind of special purpose computing platform and/or apparatus that may, at least under particular circumstances, occupy a position or location that changes from time to time. As a way of illustration, communications devices, such as mobile communications devices including, for example, wireline telephones, cellular telephones, smart telephones, laptop computers, personal entertainment systems, tablet personal computers (PC), personal audio or video devices, personal navigation devices, Internet of Things (IoT) devices, or the like. It should be noted, however, that these are merely examples of communications devices that may be used, at least in part, to implement one or more operations and/or techniques for implementing an utilizing identity verification platform, and that claimed subject matter is not limited in this respect.

It should be appreciated that operating a communications infrastructure 100 is described herein as a non-limiting example that may be implemented, in whole or in part, in the context of various electronic communications networks or combination of such networks, such as public networks (e.g., the Internet, the World Wide Web), private networks (e.g., intranets), WWAN, wireless local area networks (WLAN, etc.), or the like. It should also be noted that claimed subject matter is not limited to a particular network and/or operating environment. For example, in some instances, an optical network may be used herein, in whole or in part, such as separately and/or in any suitable combination with one or more networks discussed herein. Thus, depending on an implementation, one or more operations and/or techniques for implementing an identity verification platform.

In an implementation, communications device 102 may, for example, receive or acquire satellite positioning system (SPS) signals 104 from SPS satellites 106. In some instances, SPS satellites 106 may be from a single global navigation satellite system (GNSS), such as the GPS or Galileo satellite systems, for example. In other instances, SPS satellites 106 may be from multiple GNSS such as, but not limited to, GPS, Galileo, Glonass, or Beidou (Compass) satellite systems. In certain implementations, SPS satellites 106 may be from any one several regional navigation satellite systems (RNSS) such as, for example, WAAS, EGNOS, QZSS, just to name a few examples.

At times, communications device 102 may, for example, transmit wireless signals to, or receive wireless signals from, a wireless communication network. In one example, communications device 102 may communicate with a cellular communication network, such as by transmitting wireless signals to, or receiving wireless signals from, one or more wireless transmitters capable of transmitting and/or receiving wireless signals, such as a base station transceiver 108 over a wireless communication link 110, for example. Similarly, communications device 102 may transmit wireless signals to, or receive wireless signals from a local transceiver 112 over a wireless communication link 114. Base station transceiver 108, local transceiver 112, etc. may be of the same or similar type, for example, or may represent different types of devices, such as access points, radio beacons, cellular base stations, femtocells, or the like, depending on an implementation. Similarly, local transceiver 112 may comprise, for example, a wireless transmitter and/or receiver capable of transmitting and/or receiving wireless signals. For example, as will be seen, at times, wireless transceiver 112 may be capable of obtaining one or more observations from one or more other terrestrial transmitters.

In a particular implementation, local transceiver 112 may communicate with communications device 102 at a shorter range over wireless communication link 114 than at a range established via base station transceiver 108 over wireless communication link 110. For example, local transceiver 112 may be positioned in an indoor or like environment and may provide access to a wireless local area network (WLAN, e.g., IEEE Std. 802.11 network, etc.) or wireless personal area network (WPAN, e.g., Bluetooth® network, etc.). In another example implementation, local transceiver 112 may comprise a femtocell or picocell capable of facilitating communication via link 114 according to an applicable cellular or like wireless communication protocol. It should be understood that these are merely examples of networks that may communicate with communications device 102 over a wireless link, and claimed subject matter is not limited in this respect. For example, in some instances, communications infrastructure 100 may include a larger number of base station transceivers 108, local transceivers 112, etc.

In an implementation, base station transceiver 108 and local transceiver 112 may communicate with server 116 over a network 122 via one or more links 124. Network 122 may comprise, for example, combinations of wired or wireless communication links. In a particular implementation, network 122 may comprise, for example, a network capable of implementing an Internet Protocol (IP) infrastructure capable of facilitating or supporting communication between communications device 102 and server 116 via local transceiver 112, base station transceiver 108, etc. In another implementation, network 122 may comprise, for example cellular communication network infrastructure, such as a base station controller or master switching center to facilitate and/or support, for example, mobile cellular communication with communications device 102. Server 116 may comprise one or more database servers (e.g., for a data source, agent, identity verifier, communication services carrier, etc.), update servers, back-end servers, management servers, archive servers, location servers, positioning assistance servers, navigation servers, map servers, crowdsourcing servers, network-related servers, or the like.

In particular implementations, communications device 102 may comprise circuitry and/or processing resources capable of determining a position fix or estimated location of communications device 102, initial (e.g., a priori) or otherwise. For example, if satellite signals 104 are available, communications device 102 may compute a position fix based, at least in part, on pseudorange measurements to four or more SPS satellites 106. Here, communications device 102 may compute such pseudorange measurements based, at least in part, on pseudonoise code phase detections in signals 104 acquired from four or more SPS satellites 106. In particular implementations, communications device 102 may receive from one or more of servers 116 positioning assistance data to aid in the acquisition of signals 104 transmitted by SPS satellites 106 including, for example, almanac, ephemeris data, Doppler search windows, just to name a few examples.

Even though a certain number of computing platforms and/or devices are illustrated herein, any number of suitable computing platforms and/or devices may be implemented to facilitate and/or support one or more techniques and/or processes associated with communications infrastructure 100. For example, at times, network 122 may be coupled to one or more wired or wireless communication networks (e.g., WLAN, etc.) so as to enhance a coverage area for communications with communications device 102, one or more base station transceivers 108, local transceiver 112, server 116, or the like. In some instances, network 122 may facilitate and/or support femtocell-based operative regions of coverage, for example. Again, these are merely example implementations, and claimed subject matter is not limited in this regard.

Thus, one or more operations and/or techniques for establishing a tie or an attachment between the identity of a real-world subscriber with the digital identity of such subscriber (in an electronic digital domain). Establishment of such a tie or other type of attachment may allow an institution or organization (e.g., a financial institution, etc.) to authenticate and/or verify identity of, for example, a subscriber to a mobile communication services provider. Such a tie or other type of attachment may additionally permit assessment of the trustworthiness of a subscriber utilizing records of deterministic online events with respect to a communications device in possession of (or co-located with) a communication services subscriber. Such a tie or attachment between real-world and digital identities of a subscriber may operate to ensure that sensitive content, such as a subscriber's personally identifiable information, usernames and/or passwords, account numbers, health records, confidential employment records, etc., does not become exposed to unscrupulous individuals.

Figure 2:
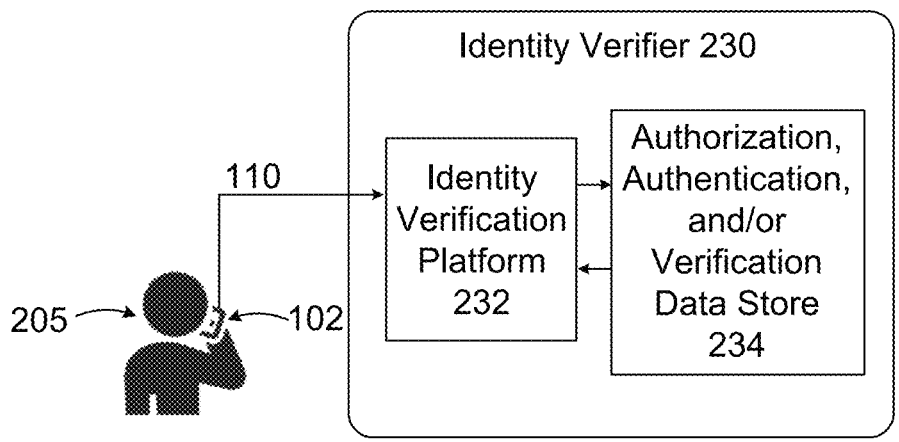
FIG. 2 is a diagram showing an implementation of an example use case or scenario for a subscriber to interact with an identity verification platform, according to an embodiment.

Attention is now drawn to FIG. 2, which is a diagram showing an implementation of an example use case or scenario for a subscriber to interact with an identity verification platform, according to an embodiment 200. In FIG. 2, subscriber 205 is co-located with communications device 102. The embodiment of FIG. 2 may be implemented utilizing an identity verification platform 232, which may comprise virtual or physical computing resources (e.g., computing devices) or any combination thereof. Identity verification platform 232 may execute computer-readable instructions (e.g., software, firmware, etc.), so as to implement one or more operations and/or processes, as discussed herein. In embodiment 200, identity verification platform 232 may be deployed, such as being physically located, for example, so as to be directed by or under the control of identity verifier 230. Responsive to determining that subscriber 205 has connected to a particular uniform resource locator (URL) via communications device 102, identity verifier 230 may operate to establish a tie or other type of attachment between subscriber 205 and a digital identity of the subscriber. Such a tie or attachment may be established responsive to determining proof of possession of communications device 102, determining that communications device 102 is bound to a specific digital account assigned to subscriber 205, and determining a reputation of communication device 102.

Identity verifier 230 may implement one or more identity verification processes in real-time or in near-real time. In this context, "real-time" refers to an amount of timeliness of content, which may be delayed by an amount of time attributable to electronic communications involving a communications network and/or signal processing of any received signals. It should be noted that information acquired or produced, for example, by input signals, output signals, operations, results, etc., associated with embodiment 200 may be represented via one or more digital signals. It should also be appreciated that even though one or more operations are illustrated or described concurrently or with respect to a certain sequence, other sequences or concurrent operations may be employed. In addition, although the description below references particular aspects or features illustrated in certain other figures, one or more operations may be performed with other aspects or features. For example, in some instances, embodiment 200 may be implemented, in whole or in part, within the communications infrastructure of FIG. 1.

Thus, embodiment 200 may, for example, begin with subscriber 205 of a communication services carrier interacting with communications device 102. Communications device 102 may interact with identity verifier 230 via a communications link, such as link 110, perhaps via a cellular transceiver, such as base station transceiver 108 of FIG. 1. Identity verifier 230 may access subscriber parameters, such as a subscriber account identifier, subscriber name, and subscriber address, for example, from authentication and/or verification data store 234. In some instances, identity verification platform 232 may provide data store 234 with, exclusively, utilizing a telephone number of (e.g., a mobile telephone number) obtained from communications device 102 received via communications link 110.

In particular embodiments, an identity verification platform may obtain a persistent identifier and/or a subscriber-unique alias from subscriber 205, which may function as an identifier that is more persistent than other types of identifiers, such as, for example, a mobile telephone number or other type of subscriber account identifier. In such embodiments, an identity verification platform may assign a persistent identifier to a subscriber so that, for example, even if a subscriber obtains a telephone number (e.g., a mobile telephone number) the persistent identifier may remain unchanged. In particular embodiments, a persistent identifier may persist even after service-disconnection, service-suspension events, switching from a first communication services carrier to a second communication services carrier, removal/replacement of a subscriber identity module, and so forth, may nonetheless persist.

In other embodiments, identity verification platform 232 may receive, via communications link 110, a subscriber account identifier, a persistent identifier, a subscriber-unique alias, or other identifier separate from a telephone number. An additional identifier may comprise an international mobile subscriber identifier (IMSI), an international mobile electronic identifier (IMEI), or a mobile station international subscriber directory number (MSISDN), or any combination thereof. In turn, an application program interface (API) of data store 234 may match a provided subscriber account identifier with parameters of a particular subscriber, such as name, physical address, current employer, etc. perhaps by accessing internal communication services records, for example.

In the embodiment of FIG. 2, identity verifier 230 may determine or ascertain proof of possession of communications device 102 by subscriber 205. Thus, for example, identity verifier 230 may convey a text, or other type of short message to communications device 102, along with a prompt, which may request that subscriber 205 enter the text or other type of short message into a user interface of communications device 102. As such, identity verifier 230 may verify that subscriber 205 is, indeed, in possession of communications device 102. Identity verifier 230 may additionally convey a second parameter to communications device 102, so as to determine the identity of subscriber 205 and/or to determine if subscriber 205 possesses an account relationship with a communication services carrier providing services to device 102. In one possible example, identity verifier 230 may request that a particular parameter not generally known to individuals other than subscriber 205 be entered into a user interface of communications device 102. In a possible example, subscriber 205 may be prompted to enter the last four digits of a Social Security number, a mother's maiden name, or may be requested to answer some other type of query with the response that, again, is not generally known to individuals other than subscriber 205.

In response to determining that subscriber 205 is in possession of communications device 102 and in response to determining that subscriber 205 has entered into an agreement (e.g., a bind or contract) with a communication services carrier providing such services to device 102, identity verifier 230 may additionally electronically determine a reputation of subscriber 205 with respect to communications device 102. For example, identity verification platform 232 may determine such reputation based, at least in part, on records of deterministic online events involving communications device 102. Such records may relate, for example, to whether subscriber 205 has recently ported or reassigned a subscriber account identifier (e.g., telephone number) from a first communication services carrier to a second communication services carrier. In particular embodiments, a subscriber who has recently ported or reassigned a subscriber account identifier may be considered to have a compromised reputation, while a subscriber who has never ported, or has not ported a subscriber account identifier for an extended period of time, for example, may be considered to have a superior reputation. In particular embodiments, a subscriber who has maintained ownership of communications device 102 for only a short period of time (e.g., a tenure of less than six months for example) may be considered to have a compromised reputation, while a subscriber who retains ownership of a communications device for a long period of time (e.g., a tenure of more than two years) may be considered to have a superior reputation. In particular embodiments, a subscriber who has recently removed/replaced a SIM of communications device 102 may be considered to have a compromised reputation, while a subscriber who has never removed/replaced a SIM of device 102 may be considered to have a superior reputation. In particular embodiments, a subscriber who has recently reset a password that controls access to a subscriber account may be considered to have a compromised reputation. Claimed subject matter may embrace additional behaviors of subscriber 205 comprising various online events involving communications device 102, which, in this context, are referred to as "online" behaviors, virtually without limitation.

In addition to online behaviors, which refer to behaviors of subscriber 205 with respect to communications device 102, identity verifier 230 may utilize off-line behaviors to determine a reputation of subscriber 205 with respect to device 102. Deterministic online events relating to off-line behaviors may refer to events undertaken by a subscriber that do not directly involve communications device 102. For example, a subscriber receiving a traffic citation (e.g., for unsafe speed, unsafe lane change, etc.) may represent a deterministic off-line event. In another example, a deterministic off-line event may refer to a subscriber having a record of voting in at least some (or perhaps all) recent city, county, state, and/or federal elections. In another example, a deterministic off-line event may refer to a subscriber obtaining a library card, becoming a member of a local service club, obtaining a gym or fitness center subscription, obtaining a security clearance from a government agency, having favorable employment history, and so forth, and claimed subject matter is not limited in this respect. Accordingly, off-line events undertaken by a subscriber that may be representative of risky behavior may bring about a compromised reputation, while more reputable behaviors may give rise to a superior reputation of subscriber 205 with respect to device 102.

It should be noted that in some instances, identity verifier 230 may consider behavioral, historical norms with respect to both online and off-line behaviors. For example, a mobile subscriber who tends to (historically, such as over a 10-year period) port his or her phone at least once a year, may be assigned a superior reputation in response to the subscriber porting his or her phone twice within the most recent two-year period. However, a mobile subscriber who has never ported his or her mobile device, may be assigned a compromised reputation in response to the subscriber porting his or her phone twice within the same two-year period.

Figure 3:
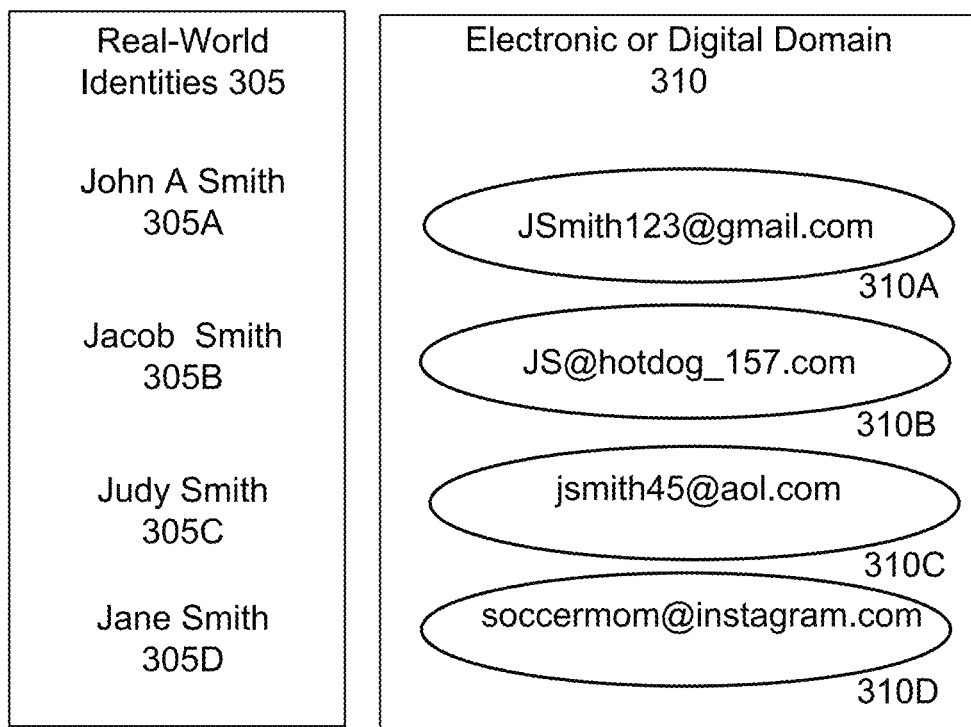
FIG. 3 is a diagram showing potential relationships between subscribers' real-world identities and the identities of such subscribers in an electronic or digital domain, according to an embodiment.

FIG. 3 is a diagram showing potential relationships between subscribers' real-world identities and the identities of such subscribers in an electronic or digital domain, according to an embodiment. As shown in FIG. 3, real-world entity John A. Smith (305A), Jacob Smith (305B), Judy Smith (305C), and Jane Smith (305D) may, perhaps, be associated with one or more email addresses or other aspects of the subscriber's electronic or digital domain. Thus, determining whether any of email addresses jsmith123@gmail.com, JS@hotdog_157.com, jsmith45@aol.com, soccermom@instagram.com are affiliated with John A. Smith (305A), Jacob Smith (305B), Judy Smith (305C), or Jane Smith (305D) can be problematic. Further, it should be noted that the above-identified email addresses include very little, if any, information that could be correlated with a particular subscriber's actual (real-world) name. For example, the email address jsmith123@gmail.com may (or may not) correspond to John Smith, Jacob Smith, Judy Smith, Jane Smith, or any one of hundreds or even thousands of individuals (including those for whom the name "Smith" does not form any part of that person's real-world identity).

Figure 4A:
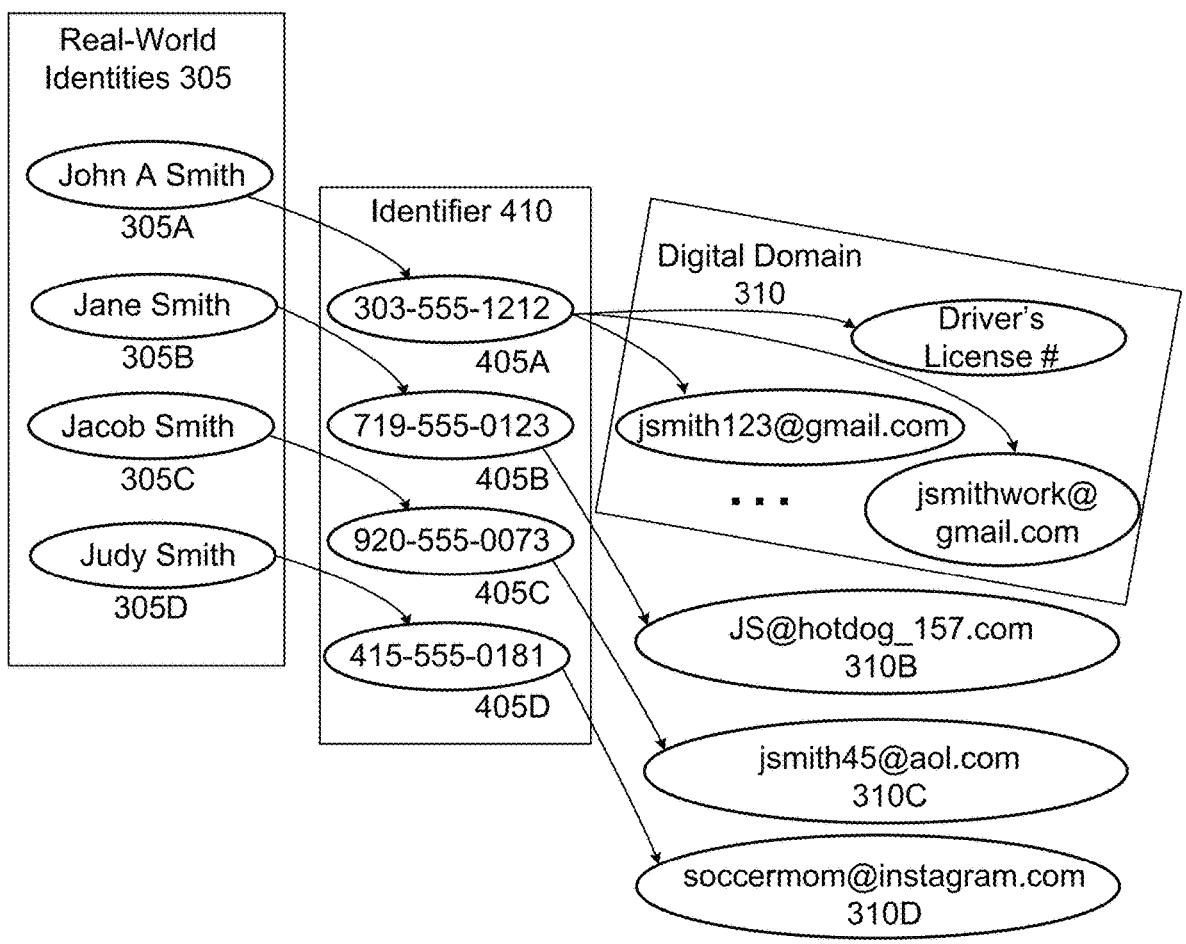
FIG. 4A is a diagram showing various ties between subscribers' real-world identities and the identities of such subscribers in an electronic or digital domain, according to an embodiment.

FIG. 4A is a diagram showing various ties between subscribers' real-world identities and the identities of such subscribers in an electronic or digital domain, according to an embodiment 400. In the embodiment of FIG. 4A, for example, real-world entity (e.g., a subscriber) John Smith (305A) may be tied or bound to the subscriber account identifier (e.g., telephone number 303-555-1212), perhaps by way of authentication via identity verifier 230, as described in FIG. 2. Accordingly, following authentication and/or verification, which may involve electronically determining proof of possession of a communications device by John Smith, electronically determining that the communications device is bound to a specific digital account, and electronically determining a favorable reputation of the communications device, a tie may be established between the subscriber "John Smith" and identifier 410, which may correspond to the subscriber account number 303-555-1212. It should be noted that a tie may also be established between a subscriber and any other type of subscriber account number (e.g., IMSI, ICC ID, MSISDN, etc.). Additionally, in particular embodiments, a tie may be established between the real-world subscriber "John Smith" and a persistent identifier as well as a subscriber-unique alias, and claimed subject matter is not limited in this respect.

In response to a tie existing between real-world entity John Smith (a subscriber) and subscriber account identifier 303-555-1212 (or any type of persistent identifier or subscriber-unique alias), it may be appreciated that additional aspects of the subscriber's digital identity may be constructed. Accordingly, utilizing the subscriber account identifier as a conduit (e.g., a telephone number of 303-555-1212, such as indicated at 405A), the email address jsmith123@gmail.com may be tied or bound (e.g., indirectly) to the real-world entity John Smith. Similarly, it may be appreciated that any number of additional email addresses belonging to John Smith (e.g. jsmithwork@gmail.com), a physical address of John Smith, an employer of John Smith, a driver's license number, or any other parameter stored by (or accessible to) an identity verifier, such as identity verifier 230 of FIG. 2, may be utilized to construct additional aspects of John Smith's digital identity in an electronic or digital domain. FIG. 4A additionally shows mapping of digital identities of Jane Smith (305B), Jacob Smith (305C), Judy Smith (305D) with @hotdog_157, jsmith45@aol.com, and soccermom@instragram.com, respectively. Mapping of digital identities is facilitated through subscriber account identifier 405B (719-555-0123) subscriber account identifier 405C (920-555-0073), and 405D (414-555-0181), respectively.

Although not explicitly identified in FIG. 4A, a trustworthiness score or trustworthiness measure for a subscriber account identifier, a persistent identifier, and/or a subscriber-unique alias may be developed utilizing additional intelligence layers for associated identifiers and devices. For example, in addition to utilizing associations between, for example, an authenticated real-world entity and a communications device to determine additional aspects of a digital identity, probabilistic methods can be employed utilizing, for example, cross-device networks. Such networks may, for example, use a Mobile Advertising identification, a Wi-Fi IP address to associate devices, a subscription to a Virtual Private Network (VPN) to enhance links between aspects of a digital identity. In another example, geolocation may be utilized to increase confidence that a real-world identity is (indeed) in contact with an IP address known (or at least suspected) to be operating proximate (e.g., less than 0.5 km) to the geolocation of the real-world entity. In another example, if a real-world identity can be located within a particular ZIP Code, and such as ZIP Code is known to envelop certain IP addresses, confidence that the real-world identity is (indeed) communicating with the IP address can be enhanced. In other instances, a trustworthiness score or a trustworthiness measure may be enhanced utilizing data that suggests a real-world identity is within the same household (e.g. street address) of other, perhaps authenticated real-world identities. In some instances, determining that members of the household utilize the same or similar IP address may bring about such increases in trustworthiness score/measures.

In other instances, determining that a real-world entity interacts with a reputable financial institution, such as a large bank or brokerage firm, may bring about an increase in a trustworthiness score or measure. On the other hand, in other instances, determining that a real-world entity interacts with a less-reputable institution may bring about a lowering of a trustworthiness score or measure. In other instances, records from third-party identity-verification entities, such as a state or county government issuing a driver's license to a real-world entity, issuance of a passport to a real-world subscriber, or any other regulated industry requiring, for example, credit checks, may enhance a trustworthiness score or measure.

Figure 4B:
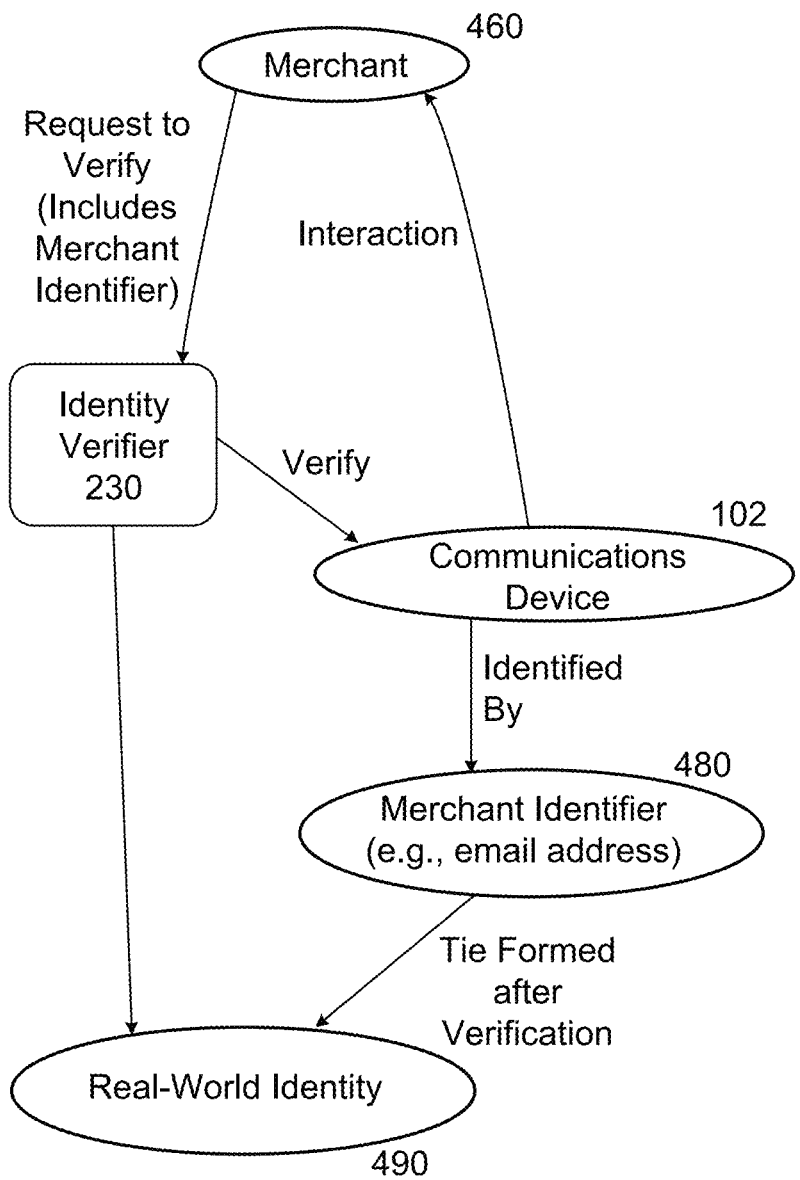
FIG. 4B is a diagram showing signal flow between a communications device, a merchant, and a verifying entity, according to an embodiment.

FIG. 4B is a diagram showing signal flow between a mobile device, a merchant, and a verifying entity, according to an embodiment 450. In the embodiment of FIG. 4B, a mobile communications device (e.g., communications device 102) may engage or interact with merchant 460. Such interaction may be to purchase, for example, a product or service, either remotely or in person, such as at a brick-and-mortar establishment. In response, merchant 460 may seek to authenticate and/or verify the mobile communications device. For example, merchant 460 may request the mobile phone number of the communications device, or may request any other identifier (e.g., a persistent identifier and/or a subscriber-unique alias) so as to obtain a measure of the creditworthiness of the subscriber. In turn, the merchant may interact with a verifier (e.g., identity verifier 230). Responsive to verification of the communications device in possession of the subscriber, the verifier may indicate such verification to the communications device. Following verification of the communications device, the verifier may form or create a tie or other type of attachment between the communications device and the merchant. Such a tie or other type of attachment may be indicated via merchant-assigned identifier 480, such as via an email address assigned to the mobile device by merchant 460. In particular embodiments, the tie or attachment between the mobile device and the merchant (in an electronic or digital domain) may be attached (or appended) to the subscriber account identity (e.g., also in electronic or digital domain) corresponding to real-world identity 490.

Figure 5:
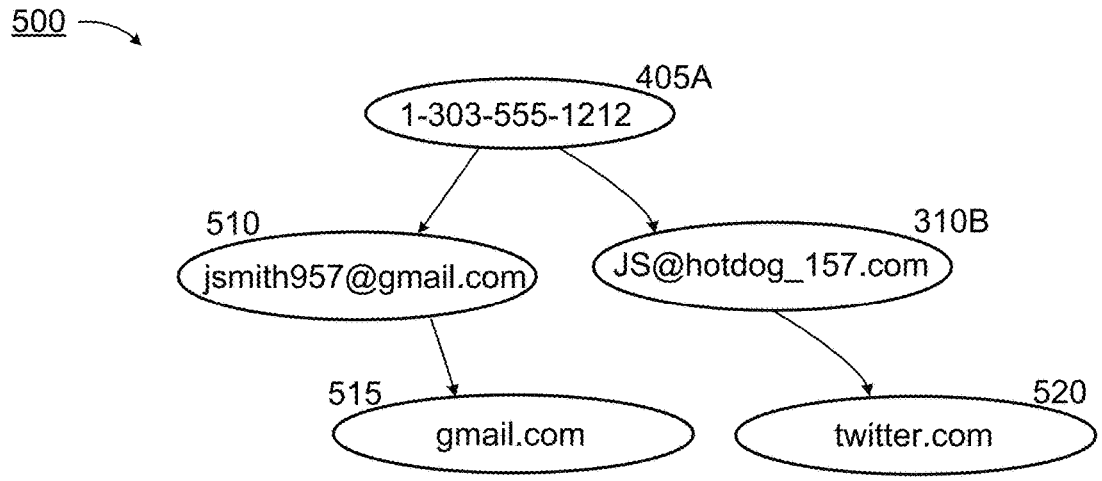
FIG. 5 is a diagram showing an identity network in an electronic or digital domain that is tied to a subscriber's real-world identify via a subscriber account identifier, according to an embodiment.

FIG. 5 is a diagram showing an identity network in an electronic or digital domain that is tied to a subscriber's real-world identify via a subscriber account identifier, according to an embodiment 500. FIG. 5 shows a relationship among the subscriber account identifier (e.g., a mobile telephone number), which forms a tie between the subscriber's real-world identity and the subscriber's identity in a digital or electronic domain. It should be noted, however, that in other embodiments, a persistent identifier or a subscriber-unique alias may be utilized to form a tie between the subscriber's real-world identity and the subscriber's identity in a digital or electronic domain. Thus, in FIG. 5, the subscriber's communications device is first utilized to form the tie between the device from the real-world identity of a subscriber (e.g., a mobile subscriber) to an electronic or digital domain. Following such formation of a tie or link between the real-world and the electronic or digital domain, interactions between a real-world identity and various logical entities, such as the subscriber's email addresses, can be utilized to gain insights with respect to the various online behaviors of the real-world identity as such behaviors reflect into the digital or electronic domain. In the example of FIG. 5, electronically determined event related to the subscriber account identifier 1-303-555-1212 and email address 510 (JSmith957@gmail.com) provides a tie between such email address, utilizing Gmail as the provider, and the subscriber account identifier. Likewise, electronically determining an event between the real-world identity corresponding to 1-303-555-1212 and twitter handle 310B (JS@hotdog_157) indicates formation of a tie between the subscriber account identifier 1-303-555-1212 and twitter.com.

Thus, it may be appreciated that interactions between a real-world identity (e.g., a user, mobile subscriber, persona) and an aspect of an electronic or digital domain, such as a real-world identity interacting with an email address, a social network account, twitter account, or any other interaction among numerous possible interactions by way of a communications device, may permit strengthening of ties between a node (representing an aspect) of an identity network. Such strengthened ties may enhance trustworthiness of a real-world identity. For example, if a link between a real-world subscriber and the email address jsmith456@gmail.com is determined to be merely a tenuous or unverified link, successive interactions may boost or strengthen the link between the real-world subscriber and jsmith456@gmail.com. Such strengthening of links in an electronic or digital domain may enhance trustworthiness of a real-world identity. On the other hand, if a real-world identity regularly (e.g. in accordance with a historical norm) interacts with various aspects of an electronic or digital domain (e.g., accesses email, social networks, etc. on a regular basis, such as more than five per day) and then refrains from doing so for an extended period of time (e.g., accesses email and/or social network accounts less than once per week) such absences may degrade the link between the digital identity of the subscriber and, for example, jsmith456@gmail.com. Such degradations may negatively impact the trustworthiness of the real-world subscriber corresponding to the digital identity. Accordingly, it may be appreciated that a subscriber's trustworthiness may fluctuate in real-time (or in near-real-time), such as to occasionally increase in value and decrease in value, in response to the subscriber interactions with aspects of the identity network in a digital domain. Such fluctuation in real-time trustworthiness of a real-world identity may range in graduated levels that may range from a real-world entity being completely (or virtually) unverified/unauthenticated to a real-world identity being completely verified/authenticated. In some instances, a real-world identity corresponding to a subscriber may undergo large and nearly instantaneous degradations in trustworthiness, perhaps in response to the subscriber visiting websites or interacting with devices, known to be utilized for transmission of, for example, malware or utilized for engaging in other types of potentially dangerous behavior.

Figure 6:
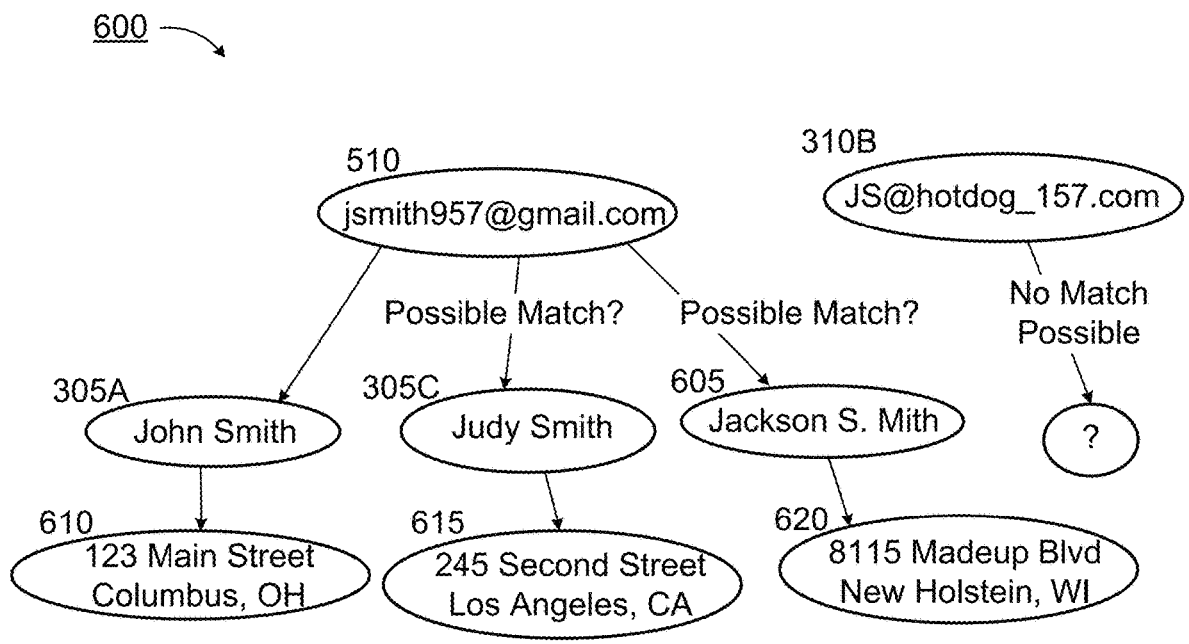
FIG. 6 is a diagram showing an identity network in an electronic or digital domain showing ties among various aspects of a subscriber's identity network, according to an embodiment.

FIG. 6 is a diagram showing an identity network in an electronic or digital domain showing ties among various aspects of a subscriber's identity network, according to an embodiment 600. In the embodiment of FIG. 6, which involves attempting to match email address 510 of a subscriber in an electronic or digital domain (jsmith957@gmail.com) with a real-world identity, such as subscriber 305A (John Smith), subscriber 305C (Judy Smith), subscriber 605 (Jackson S. Mith), may employ fuzzy or imprecise logic which may, for example, lead to potential possibilities for matching among real-world identities and, for example, an email address. Accordingly, although it may be possible to determine name and address, of an subscriber, such as John Smith living at address 610 (e.g., 123 Main Street, Columbus, Ohio), Judy Smith living at address 615 (e.g., 245 Second Street, Los Angeles Calif.), and Jackson S. Mith living at address 620 (e.g., 8115, Madeup Boulevard, New Holstein Wisc.), such probability-based approaches may rarely result in an accurate match being electronically determined between a real-world entity and an email aspect of a digital identity in a digital or electronic domain. In some instances, attempting to match twitter handle 310B (e.g., JS@hotdog_157), may be impossible or virtually impossible.

Figure 7:
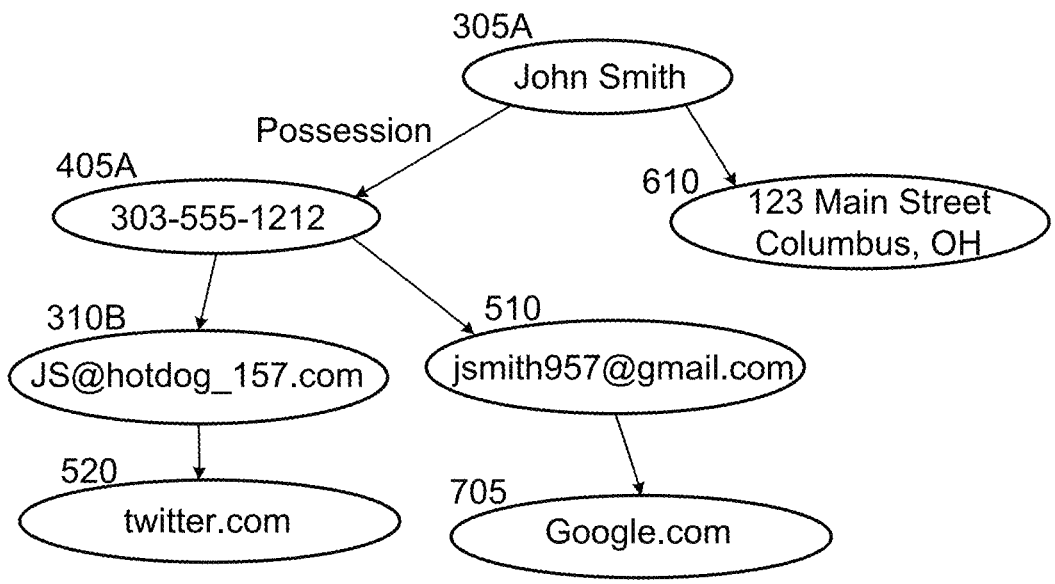
FIG. 7 is a diagram showing changes in ties between or among aspects of a subscriber's identity network in an electronic or digital domain, according to an embodiment.

FIG. 7 is a diagram showing changes in ties between or among aspects of a subscriber's identity network in an electronic or digital domain, according to an embodiment 700. As shown in FIG. 7, responsive to verification of proof-of-possession of a device, such as communications device 102 co-located with subscriber 205, ties or other attachments among aspects of a digital identity in an electronic or digital domain may result in increased confidence in ascertaining aspects of a subscriber's electronic or digital domain. For example, responsive to verification of the position of a communications device by a particular subscriber, such as by way of establishing a tie between the subscriber account identifier (e.g., 1-303-5551212) and real-world identity John Smith, correctly identifying additional ties in an electronic or digital domain may be possible.

Hence, as shown in FIG. 7, responsive to a real-world identity of subscriber 305A (John Smith) being verifiably in possession of, or co-located with, a particular communications device (e.g., a communications device corresponding to a specific subscriber account identifier, telephone number, persistent identifier, subscriber-unique alias, etc.), further interactions involving the communications device can authoritatively establish links between the real-world identity and email providers. For example, following electronic determination of a particular communications device accessing email address 510 (jsmith957@gmail.com), it may be straightforward to recognize that the real-world identity for subscriber 305A (John Smith) can be linked with email provider 705 (Google.com) via such email address. Email provider 705 may correspond to digital identity 805, which is an aspect of subscriber 305 a in an electronic or digital domain. In another example, following the electronic determination of a particular communications device accessing the twitter feed utilizing twitter handle 310B (JS@hotdog_157), it may be straightforward to recognize that the real-world identity for subscriber 305A (John Smith) can be linked with twitter.com via the JS@hotdog_157 handle. As a consequence of the formation of authoritative links among aspects of a digital identity, additional aspects of a real-world identity can be formed. Accordingly, as shown in FIG. 7, responsive to subscriber account identifier 405A (1-303-555-1212) being concretely or authoritatively linked with subscriber 305A (John Smith), an address of subscriber 305A (John Smith) can also be authoritatively determined.

Figure 8:
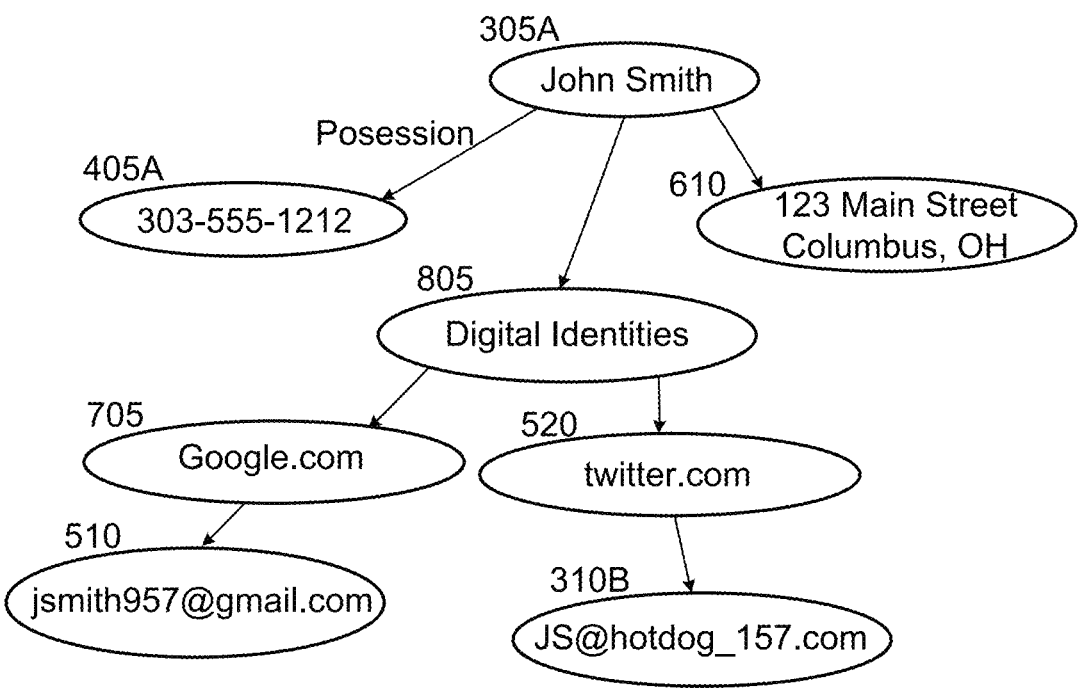
FIG. 8 is a diagram showing modifications to an identity network in an electronic or digital domain, according to an embodiment.

FIG. 8 is a diagram showing modifications to an identity network in an electronic or digital domain, according to an embodiment 800. As indicated in FIG. 8, following a tie being made among aspects of an identity in an electronic or digital domain, a tie between a real-world identity and digital identity may utilize an aspect other than a subscriber account identifier. For example, as shown in FIG. 8, subscriber account identifier 1-303-555-1212 may no longer represent an exclusive conduit or tie between real-world subscriber 305A (John Smith) and, for example, twitter handle 310B (JS@hotdog_157) and/or email address 510 (jsmith957@gmail.com). Rather, as shown in FIG. 8, in view of electronic determinations of interactions between the real-world identity of subscriber 305A (John Smith) and a particular mobile device (e.g., a device having a telephone number of 303-555-1212) additional ties in an identity network may stem from a particular communications device having a subscriber account identifier, for example. Accordingly, further revisions of the identity network of FIG. 8 may have no reliance on, and may thus exclude, the subscriber account number. In the example of FIG. 8, email addresses 510 and Twitter handle 310B of the real-life subscriber 305A (John Smith) may be authoritatively linked with a communications device located with subscriber 305A (John Smith) rather than with a subscriber account identifier of such communications device.

Figure 9:
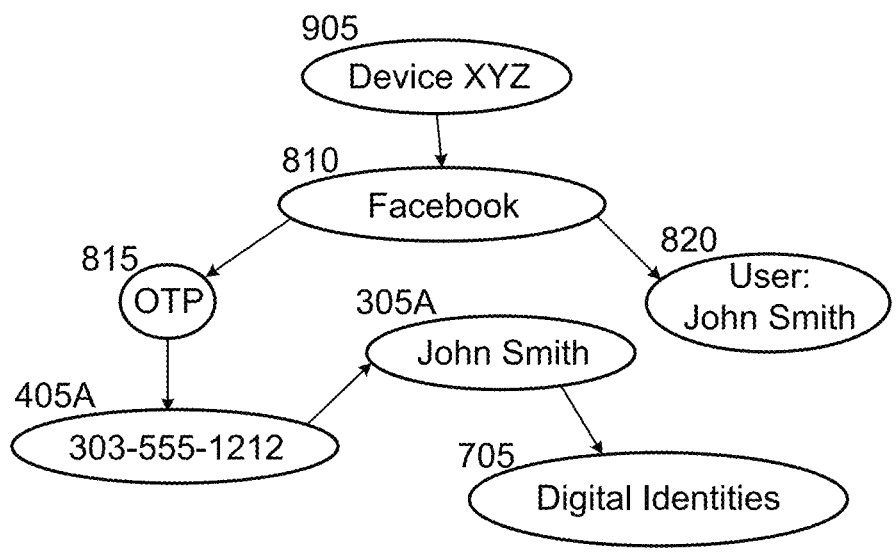
FIG. 9 is a diagram showing modifications to an identity network in an electronic or digital domain responsive to use of a one-time password, according to an embodiment.

FIG. 9 is a diagram showing modifications to an identity network in an electronic or digital domain responsive to use of a one-time password, according to an embodiment 900. In FIG. 9, responsive to a social network (e.g., Facebook) transmitting a one-time password to a communications device co-located with real-world identity 820 (e.g., user: John Smith) a particular URL can be tied or bound directly to real-world identity 820 (John Smith). For example, communications device 905 (device XYZ) may be utilized to access a social network (Facebook) via a username and/or password corresponding to a subscriber. Social network 810 may be linked to subscriber identifier 405A, which corresponds to subscriber identifier 303-555-1212. However, responsive to one-time Facebook password 815 being conveyed to a communications device corresponding to subscriber account identifier 303-555-1212, the one-time password may provide the authoritative link between social network 810 (Facebook) and subscriber account identifier 405A. Additionally, responsive to subscriber account identifier 405A having a strong tie to social network 810, subscriber account identifier 405A may now be used to provide a tie to subscriber 305A (John Smith). Additionally, by way of a tie between subscriber account identifier 405A and subscriber 305A (John Smith), other digital identities can be determined, perhaps with increased authority.

Figure 10:
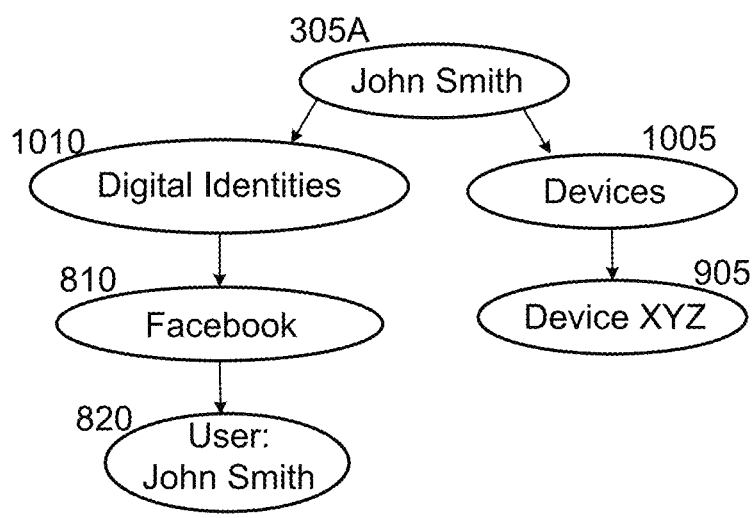
FIG. 10 is a diagram showing a generalized identity network in an electronic or digital domain, according to an embodiment.

FIG. 10 is a diagram showing a generalized identity network in an electronic or digital domain, according to an embodiment 1000. As shown in FIG. 10, responsive to establishing a plurality of ties between a real-world identity (e.g., via a subscriber account identifier, a persistent identifier, and/or a subscriber-unique alias) and an identity in an electronic or digital domain, logical groupings may be established in the electronic or digital domain. For example, as shown in FIG. 10, subscriber 305A (John Smith) represented in an electronic or digital domain may be represented by identities 1010 (digital identities) as well as devices 1005. Within a grouping of digital identities, social network 810 (Facebook) may be represented along with a user name associated with subscriber 305A having a particular username (User: John Smith). Likewise, in an electronic or digital domain, subscriber 305 (John Smith) may be represented via a grouping of devices 1005 comprising identifiers for ancillary devices owned or at least curated by subscriber 305A (John Smith) such as device 905 (device XYZ). Formation of such logical groupings (e.g., social network groupings, device groupings, and so forth) can bring about expansion of coverage of a digital identity and an electronic or digital domain.

Figure 11:
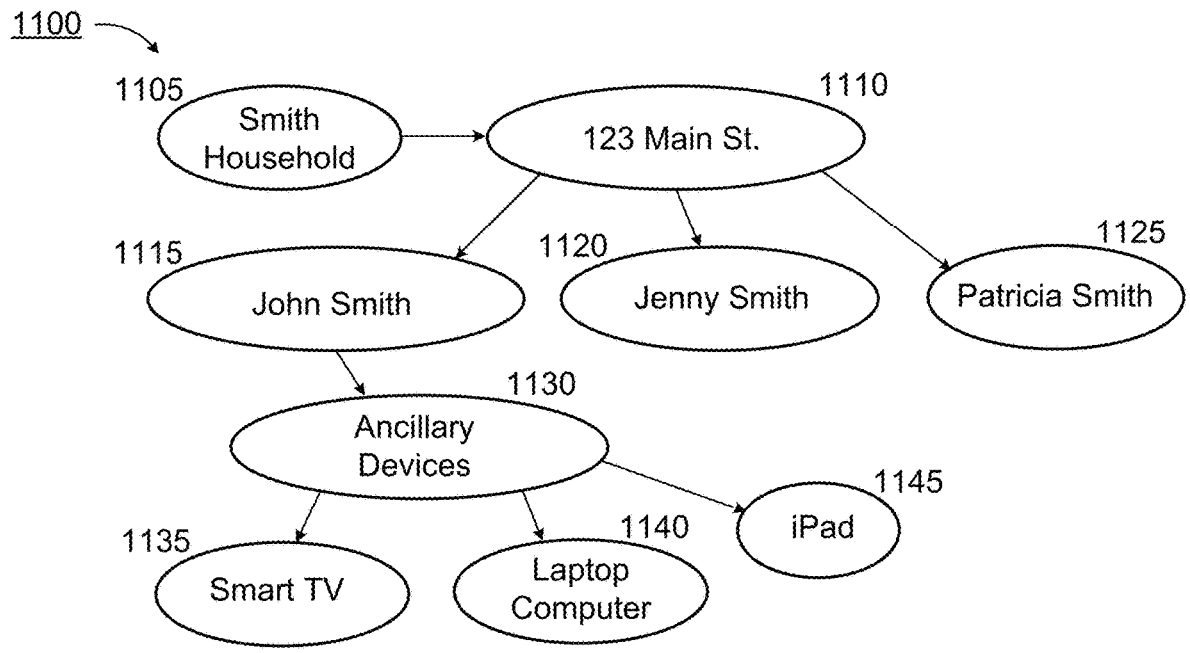
FIG. 11 are diagrams showing additional identity networks in an electronic or digital domain, according to an embodiment.

FIG. 11, shows additional identity networks in an electronic or digital domain, according to an embodiment 1100. In the embodiment of FIG. 11, in response to electronic determination that various members of household 1105 ("Smith" household) may be residing at a similar or even identical IP address, such as may be the case in response to member 1115 (John Smith), member 1120 (Jenny Smith), and member 1125 (Patricia Smith) sharing or occupying the same household and/or having a common (post office) mailing address. In particular embodiments, determining that John Smith, Jenny Smith, and Patricia Smith share or occupy the same household, may involve electronically determining an IP address of the router or other Wi-Fi device, for example, if such Wi-Fi devices are utilized to provide network conductivity to the members of the household. Additionally, as shown in FIG. 11, logical group 1130 (ancillary devices) may comprise devices operated by member 1115 (John Smith), such as device 1135 (a smart TV), device 1140 (a laptop computer), and device 1145 (an iPad), which, for example, may share John Smith's username and password. In this context, and "ancillary device" refers to an electronic device (e.g., smart TV 1135, laptop computer 1140, iPad 1145) that is owned or otherwise curated a subscriber, such as John Smith. An "ancillary device" may also refer to an IOT device, such as a an automated garage door opener, sensor, or other device controlled and are curated by a subscriber.

Figure 12:
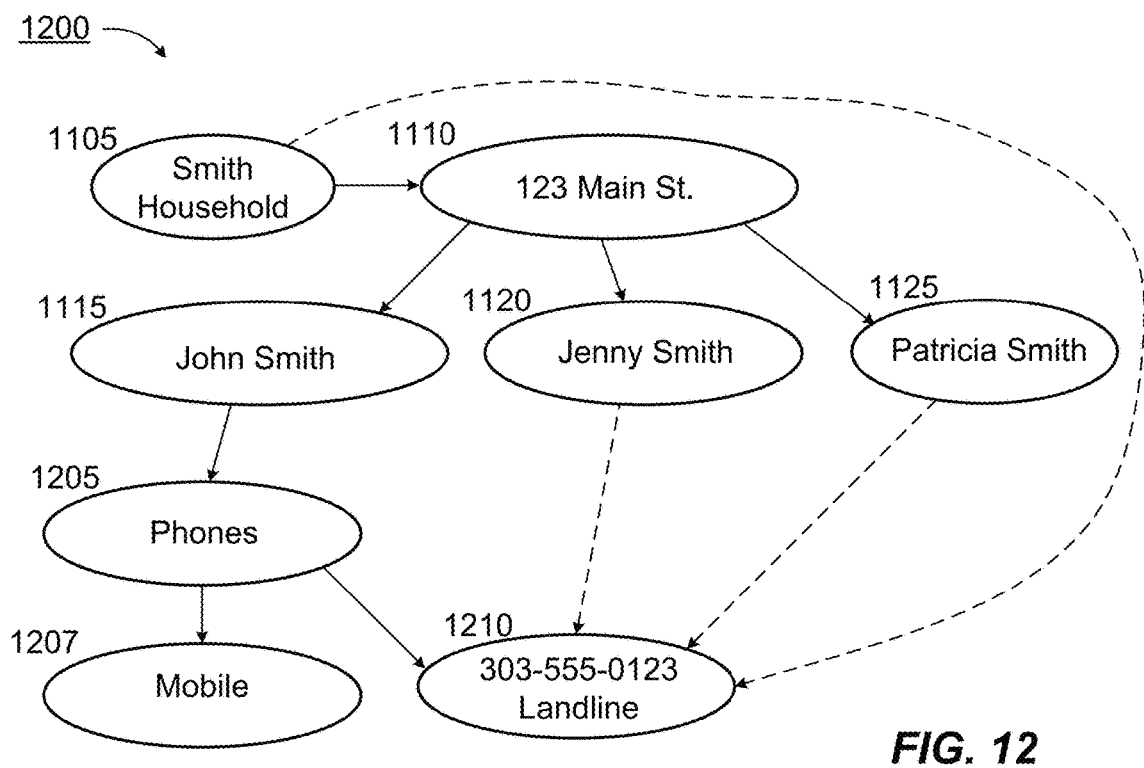
FIG. 12 is an identity network showing interactions to modify ties in a subscriber's identity and electronic digital domain, according to an embodiment.

FIG. 12 is an identity network showing interactions to modify ties in a subscriber's identity and electronic digital domain, according to an embodiment 1200. As shown in FIG. 12, members of household 1105 (the Smith household) having a physical address 1110 (123 Main Street). Members of household 1105 may all utilize, at least time to time, a landline/wireline telephone corresponding to a telephone number of 303-555-0123. In the embodiment of FIG. 12, even though the landline/wireline telephone may be registered in the name of John Smith, all members of the Smith household may be grouped as users of one or more ancillary devices (e.g., a landline/wireline telephone). Such ancillary devices, such as landline 1210, is physically located within the confines of the Smith household and under the care/duration of John, Jenny, and/or Patricia Smith. Accordingly, a direct tie may be made between household 1105 (the Smith household) and landline 1210 (corresponding to 303-555-0123). Further, landline 1210, along with mobile 1207, may form members of phones group 1205.

It may be appreciated that such expansions in customer relations management data may be achieved when querying any member of a particular household. Accordingly, identity networks can be expanded within households, increasing the overall knowledge possessed by a customer relations management system. Accordingly, by leveraging the digital-to-real-world connection, it becomes possible to create a domain-spanning network that ties digital identities and real-world identities.

Figure 13:
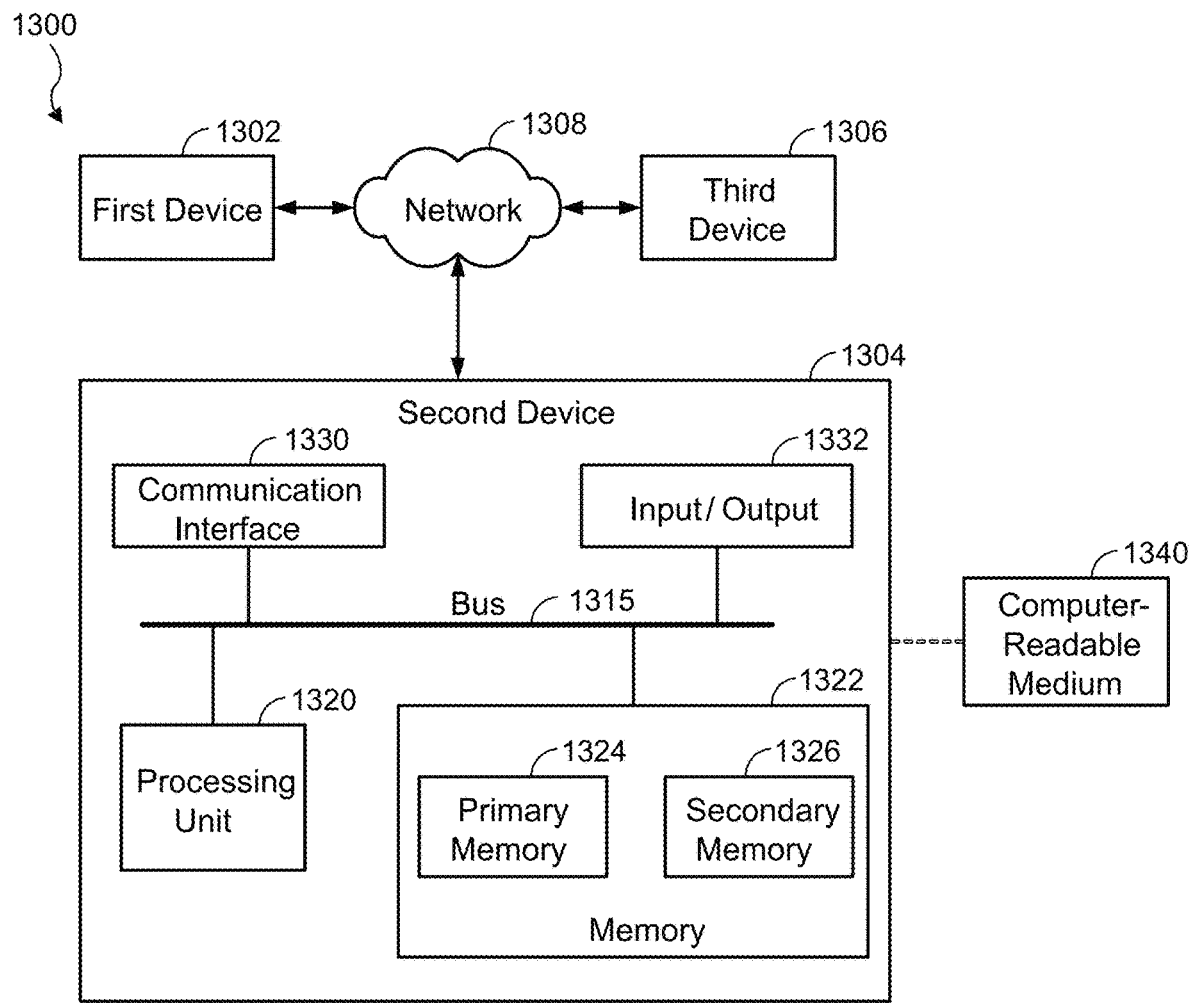
FIG. 13 is a schematic diagram illustrating an implementation of a computing device in an example computing environment, according to an embodiment.

In FIG. 13, computing device 702 may provide one or more sources of executable computer instructions in the form of physical states and/or signals (e.g., stored in memory states), for example. Computing device 1302 may communicate with computing device 1304 by way of a network connection, such as via network 1308, for example. As previously mentioned, a connection, while physical, may be virtual while not necessarily being tangible. Although computing device 1304 of FIG. 13 shows various tangible, physical components, claimed subject matter is not limited to a computing devices having only these tangible components as other implementations and/or embodiments may include alternative arrangements that may comprise additional tangible components or fewer tangible components, for example, that function differently while achieving similar results. Rather, examples are provided merely as illustrations. It is not intended that claimed subject matter be limited in scope to illustrative examples.

Memory 1322 may comprise any non-transitory storage medium. Memory 1322 may comprise, for example, primary memory 1324 and secondary memory 1326, additional memory circuits may be used. Memory 1322 may comprise, for example, random access memory, read only memory, etc., such as in the form of one or more storage devices and/or systems, such as, for example, a disk drive including an optical disc drive, a tape drive, a solid-state memory drive, etc., just to name a few examples.

Memory 1322 may comprise one or more articles utilized to store a program of executable computer instructions. For example, processor 1320 may fetch executable instructions from memory and proceed to execute the fetched instructions. Memory 1322 may also comprise a memory controller for accessing device readable-medium 1340 that may carry and/or make accessible digital content, which may include code, and/or instructions, for example, executable by processor 1320 and/or some other device, such as a controller, as one example, capable of executing computer instructions, for example. Under direction of processor 1320, a non-transitory memory, such as memory cells storing physical states (e.g., memory states), comprising, for example, a program of executable computer instructions, may be executed by processor 1320 and able to generate signals to be communicated via a network, for example, as previously described. Generated signals may also be stored in memory, also previously suggested.

Memory 1322 may store electronic files and/or electronic documents, such as relating to one or more users, and may also comprise a machine-readable medium that may carry and/or make accessible content, including code and/or instructions, for example, executable by processor 1320 and/or some other device, such as a controller, as one example, capable of executing computer instructions, for example. As previously mentioned, the term electronic file and/or the term electronic document are used throughout this document to refer to a set of stored memory states and/or a set of physical signals associated in a manner so as to thereby form an electronic file and/or an electronic document. That is, it is not meant to implicitly reference a particular syntax, format and/or approach used, for example, with respect to a set of associated memory states and/or a set of associated physical signals. It is further noted an association of memory states, for example, may be in a logical sense and not necessarily in a tangible, physical sense. Thus, although signal and/or state components of an electronic file and/or electronic document, are to be associated logically, storage thereof, for example, may reside in one or more different places in a tangible, physical memory, in an embodiment.

Algorithmic descriptions and/or symbolic representations are examples of techniques used by those of ordinary skill in the signal processing and/or related arts to convey the substance of their work to others skilled in the art. An algorithm is, in the context of the present patent application, and generally, is considered to be a self-consistent sequence of operations and/or similar signal processing leading to a desired result. In the context of the present patent application, operations and/or processing involve physical manipulation of physical quantities. Typically, although not necessarily, such quantities may take the form of electrical and/or magnetic signals and/or states capable of being stored, transferred, combined, compared, processed and/or otherwise manipulated, for example, as electronic signals and/or states making up components of various forms of digital content, such as signal measurements, text, images, video, audio, etc.

Processor 1320 may comprise one or more circuits, such as digital circuits, to perform at least a portion of a computing procedure and/or process. By way of example, but not limitation, processor 1320 may comprise one or more processors, such as controllers, microprocessors, microcontrollers, application specific integrated circuits, digital signal processors, programmable logic devices, field programmable gate arrays, the like, or any combination thereof. In various implementations and/or embodiments, processor 1320 may perform signal processing, typically substantially in accordance with fetched executable computer instructions, such as to manipulate signals and/or states, to construct signals and/or states, etc., with signals and/or states generated in such a manner to be communicated and/or stored in memory, for example.

FIG. 13 also illustrates device 1304 as including a component 1332 operable with input/output devices, communication interface 1330, and communication bus 1315, for example, so that signals and/or states may be appropriately communicated between devices, such as device 1304 and an input device and/or device 1304 and an output device. A user may make use of an input device, such as a computer mouse, stylus, track ball, keyboard, and/or any other similar device capable of receiving user actions and/or motions as input signals. Likewise, for a device having speech to text capability, a user may speak to generate input signals. Likewise, a user may make use of an output device, such as a display, a printer, etc., and/or any other device capable of providing signals and/or generating stimuli for a user, such as visual stimuli, audio stimuli and/or other similar stimuli.

Example Implementation

A possible plan (among numerous possible plans) for implementation of a communications device information identity network may include the use of a database for providing graphs in an electronic or digital domain, which correspond to identity networks. However, in some instances, while such a database they be utilized to store an entirety of parameters corresponding to numerous real-world identities, relationships, and/or nodes corresponding to aspects of a real-world identity, it may be appreciated that modeling such identity networks can become computationally inefficient, especially in response to modeling certain types of relationships.

For example, in a graph database suitable for modeling identity networks, communications devices may be more tightly tied or attached to a real-world identity (e.g., user, subscriber, persona, etc.) via a device and SIM card. However, a SIM card may store parameters that relate or tie back to a communication services carrier. Accordingly, modeling real-world identities in an electronic or digital domain, such as corresponding to a ported device having a tie or other type of relationship with a new communication services carrier (such as by way of porting to a new communication services carrier) may point or be directed toward a new carrier.

In an example implementation, however, may give rise to an identity graph for a first communication services carrier may comprise, for example, over 100,000,000 edges. Such a large number of edges may result in such a node unduly inefficient sense, at least in some implementations, a graph databases suitable for modeling an identity network may operate most efficiently when no node includes more than a few dozen edges or relationships connected between or among nodes.

Additionally, it is possible that certain nodes of the graph to comprise or referring to sensitive content (e.g., personally identify information). In some instances, databases for providing graphs that correspond to identity networks may not be configured to operate in a manner that protects highly sensitive data, such as personally identifiable information, account numbers, etc. Further, applying parameters related to transactions in the graph database may introduce additional inefficiency. For example, a communications device that authenticates numerous times (e.g., between 10 and 30 times) may give rise to a threshold at which a graph corresponding to an identity network may approach, for example, tens of thousands of nodes (e.g., wherein each transaction may represent an aspect of electronic or digital identity) and edges (representing relationships between aspects of an electronic or digital entity) for a single subscriber. Accordingly, it may be appreciated that such a system could introduce process efficiencies especially as such relate to recovery of an identity in electronic or digital domain.

Thus, a hybrid system may be constructed, in which sensitive content is not stored within the graph (representing the identity network) directly. Rather, sensitive content or parameters may be stored in databases separate from databases utilized to store parameters related to subscriber identity networks. For example, transactional data may be best suited for storage within a transactional database, such as Hadoop, or Cassandra. Such databases are specifically designed around time-stamped, transactional data in large quantities, tied to a single key lookup (such as, in this instance, the persona or phone identifier, such as PID or PFA values.).

Hadoop refers to a distributed computing system, which employs a map-reduce type of architecture. In the context of the present patent application, the terms map-reduce architecture and/or similar terms are intended to refer to a distributed computing system implementation and/or embodiment for processing and/or for generating larger sets of signal samples employing map and/or reduce operations for a parallel, distributed process performed over a network of devices. A map operation and/or similar terms refer to processing of signals (e.g., signal samples) to generate one or more key-value pairs and to distribute the one or more pairs to one or more devices of the system (e.g., network). A reduce operation and/or similar terms refer to processing of signals (e.g., signal samples) via a summary operation (e.g., such as counting the number of real-world of identities in a queue, yielding frequencies of subscriber account identifiers, persistent identifiers, etc.). A system may employ such an architecture, such as by marshaling distributed server devices, executing various tasks in parallel, and/or managing communications, such as signal transfers, between various parts of the system (e.g., network), in an embodiment. Hadoop refers to an open source implementation and/or embodiment of a map-reduce type architecture (available from the Apache Software Foundation, 1901 Munsey Drive, Forrest Hill, MD, 21050-2747), but may include other aspects, such as the Hadoop distributed file system (HDFS) (available from the Apache Software Foundation, 1901 Munsey Drive, Forrest Hill, MD, 21050-2747). In general, therefore, "Hadoop" and/or similar terms (e.g., "Hadoop-type," etc.) refer to an implementation and/or embodiment of a scheduler for executing larger processing jobs using a map-reduce architecture over a distributed system. Furthermore, in the context of the present patent application, use of the term "Hadoop" is intended to include versions, presently known and/or to be later developed.

In addition, large quantities of textual data may be best stored in document databases, so the persona nodes in the electronic or digital domain need not contain a large history of data. In these instances, such data can instead be stored in a document databases, again keyed or triggered by a smaller set of keys (e.g., PID, PFA, etc.) or an address identifier key, for example. Finally, large groupings of normalized data can be stored in relational databases. Thus, for example, in an instant such as described above, in which greater than 100,000,000 phone numbers may share a single communication services carrier, the data can be stored and related through a relational database, which does not suffer from slowdowns based, at least in part, on a large number of occurrences of related data.

Thus, by leveraging a hybrid system, utilizing databases specialized for particular types of data, it may be possible to optimize certain aspects of database management of identity networks so as to permit overall storage with increased speed.

A phone number, for example, or any other type of subscriber account identifier found through authentication, or a personal identifier such as a merchant's customer ID, can be initially found in the graph database that represents an identity network. Finding such an identifier may be utilized to recover the persona or phone identifier corresponding to a real-world identity (e.g., subscriber, user, persona, etc.). In turn, such an identifier may be utilized as the key to the other databases, retrieving transactional data to enable building of a current picture of trust. Document data to build the underlying real-world identity and the identity in an electronic or digital domain corresponding to the real-world identity, and (as needed) relational data may be used to extract a picture of large and otherwise unwieldy connections.

Thus, such "separation of responsibility," in which a plurality of databases may be permitted to perform optimally as a function of datatypes stored within each database, may permit optimal operation and management of a large-scale system of identity networks. Further, since each query can be performed in parallel with other queries, rapid association of all needed data corresponding to a real-world identity may provide a complete picture of a real-world identity, and time periods that do not exceed 50 milliseconds.

Accordingly, in an implementation, in response to a subscriber account identifier (e.g., a telephone number, persistent ID, and/or a subscriber-unique alias) being sent to an identity verifier in connection with any type of authentication, auditing, and/or verification operation, the phone number, being unique or at least virtually unique, may bring about a rapid lookup in the graph database, typically performed in under 10 ms. The subscriber account identifier edge nodes associated with the identifier, or aspects of a digital identity network, can be retrieved virtually instantly, and can be extended to retrieve the connected real-world identity as part of the initial search with little to no overhead. In general, it may be appreciated that in many instances accessing an identity graph in an electronic or digital domain may occur in non-real-time scenarios. Thus, even in response to a large number of entities, such as greater than 1000 (which may be relatively uncommon) accessing an identity graph in an electronic or digital domain need not represent any type of bottleneck in a subscriber authentication process.

In particular embodiments, responsive to a primary real-world entity node being retrieved from a node of an electronic or digital domain may be associated with keying parameters so as to permit retrieval of personally identifiable information, for example, from additional (secured) databases. For example, a retrieved key may permit retrieval of documents from a document database, and a PFA (Payfone Alias) or other subscriber-unique identifier may be utilized to identify and/or retrieve parameters relevant to databases that store transactions records. Thus, parameters relevant to various aspects of a subscriber's electronic or digital domain may be retrieved nearly instantaneously, and thus be ready for use on a real-time basis. In cases in which trustworthiness parameters, trust scores, etc. are to be provided, separate transactional and document databases may be utilized to supply requested parameters.

In an instance in which a customer passes a customer ID (e.g., such as a transaction signed by a merchant), transactional parameters may be stored in a relational database, as each merchant could have thousands to millions of customer IDs. However, in a relational database, a customer ID may map directly to a real-world entity ID, which may represent a unique identifier of a node in a graph database representing the identity network in an electronic or digital domain. Accordingly, such maps may represent a series of brief accesses of unique identification parameters, which may characterize a number of aspects of a real-world subscriber. Accordingly, as described hereinabove, responsive to a real-world identifier (e.g., a subscriber account identifier, a persistent identifier, a subscriber-unique alias, etc.) has been obtained, relevant parameters data may be obtained in durations typically measured in single-digit milliseconds. Accordingly, it may be appreciated that parameters regarding a large number of subscribers may be obtained in a small fraction of a second.

In one instance, utilizing a simple, relatively rudimentary system, between 25,000 and 50,000 transactions per second are possible, while conducting database operations within normal parameters. Thus, the methodology outlined above is believed to be powerful yet highly performant.

In the context of the present patent application, the term "connection," the term "component" and/or similar terms are intended to be physical, but are not necessarily always tangible. Whether or not these terms refer to tangible subject matter, thus, may vary in a particular context of usage. As an example, a tangible connection and/or tangible connection path may be made, such as by a tangible, electrical connection, such as an electrically conductive path comprising metal or other conductor, that is able to conduct electrical current between two tangible components. Likewise, a tangible connection path may be at least partially affected and/or controlled, such that, as is typical, a tangible connection path may be open or closed, at times resulting from influence of one or more externally derived signals, such as external currents and/or voltages, such as for an electrical switch. Non-limiting illustrations of an electrical switch include a transistor, a diode, etc. However, a "connection" and/or "component," in a particular context of usage, likewise, although physical, can also be non-tangible, such as a connection between a client and a server over a network, particularly a wireless network, which generally refers to the ability for the client and server to transmit, receive, and/or exchange communications, as discussed in more detail later.

In a particular context of usage, such as a particular context in which tangible components are being discussed, therefore, the terms "coupled" and "connected" are used in a manner so that the terms are not synonymous. Similar terms may also be used in a manner in which a similar intention is exhibited. Thus, "connected" is used to indicate that two or more tangible components and/or the like, for example, are tangibly in direct physical contact. Thus, using the previous example, two tangible components that are electrically connected are physically connected via a tangible electrical connection, as previously discussed. However, "coupled," is used to mean that potentially two or more tangible components are tangibly in direct physical contact. Nonetheless, "coupled" is also used to mean that two or more tangible components and/or the like are not necessarily tangibly in direct physical contact, but are able to co-operate, liaise, and/or interact, such as, for example, by being "optically coupled." Likewise, the term "coupled" is also understood to mean indirectly connected. It is further noted, in the context of the present patent application, since memory, such as a memory component and/or memory states, is intended to be non-transitory, the term physical, at least if used in relation to memory necessarily implies that such memory components and/or memory states, continuing with the example, are tangible.

Unless otherwise indicated, in the context of the present patent application, the term "or" if used to associate a list, such as A, B, or C, is intended to mean A, B, and C, here used in the inclusive sense, as well as A, B, or C, here used in the exclusive sense. With this understanding, "and" is used in the inclusive sense and intended to mean A, B, and C; whereas "and/or" can be used in an abundance of caution to make clear that all of the foregoing meanings are intended, although such usage is not required. In addition, the term "one or more" and/or similar terms is used to describe any feature, structure, characteristic, and/or the like in the singular, "and/or" is also used to describe a plurality and/or some other combination of features, structures, characteristics, and/or the like. Likewise, the term "based on" and/or similar terms are understood as not necessarily intending to convey an exhaustive list of factors, but to allow for existence of additional factors not necessarily expressly described.

Furthermore, it is intended, for a situation that relates to implementation of claimed subject matter and is subject to testing, measurement, and/or specification regarding degree, that the particular situation be understood in the following manner. As an example, in a given situation, assume a value of a physical property is to be measured. If alternatively reasonable approaches to testing, measurement, and/or specification regarding degree, at least with respect to the property, continuing with the example, is reasonably likely to occur to one of ordinary skill, at least for implementation purposes, claimed subject matter is intended to cover those alternatively reasonable approaches unless otherwise expressly indicated. As an example, if a plot of measurements over a region is produced and implementation of claimed subject matter refers to employing a measurement of slope over the region, but a variety of reasonable and alternative techniques to estimate the slope over that region exist, claimed subject matter is intended to cover those reasonable alternative techniques unless otherwise expressly indicated.

To the extent claimed subject matter is related to one or more particular measurements, such as with regard to physical manifestations capable of being measured physically, such as, without limit, temperature, pressure, voltage, current, electromagnetic radiation, etc., it is believed that claimed subject matter does not fall with the abstract idea judicial exception to statutory subject matter. Rather, it is asserted, that physical measurements are not mental steps and, likewise, are not abstract ideas.

It is noted, nonetheless, that a typical measurement model employed is that one or more measurements may respectively comprise a sum of at least two components. Thus, for a given measurement, for example, one component may comprise a deterministic component, which in an ideal sense, may comprise a physical value (e.g., sought via one or more measurements), often in the form of one or more signals, signal samples and/or states, and one component may comprise a random component, which may have a variety of sources that may be challenging to quantify. At times, for example, lack of measurement precision may affect a given measurement. Thus, for claimed subject matter, a statistical or stochastic model may be used in addition to a deterministic model as an approach to identification and/or prediction regarding one or more measurement values that may relate to claimed subject matter.

For example, a relatively large number of measurements may be collected to better estimate a deterministic component. Likewise, if measurements vary, which may typically occur, it may be that some portion of a variance may be explained as a deterministic component, while some portion of a variance may be explained as a random component. Typically, it is desirable to have stochastic variance associated with measurements be relatively small, if feasible. That is, typically, it may be preferable to be able to account for a reasonable portion of measurement variation in a deterministic manner, rather than a stochastic matter as an aid to identification and/or predictability.

Along these lines, a variety of techniques have come into use so that one or more measurements may be processed to better estimate an underlying deterministic component, as well as to estimate potentially random components. These techniques, of course, may vary with details surrounding a given situation. Typically, however, more complex problems may involve use of more complex techniques. In this regard, as alluded to above, one or more measurements of physical manifestations may be modelled deterministically and/or stochastically. Employing a model permits collected measurements to potentially be identified and/or processed, and/or potentially permits estimation and/or prediction of an underlying deterministic component, for example, with respect to later measurements to be taken. A given estimate may not be a perfect estimate; however, in general, it is expected that on average one or more estimates may better reflect an underlying deterministic component, for example, if random components that may be included in one or more obtained measurements, are considered. Practically speaking, of course, it is desirable to be able to generate, such as through estimation approaches, a physically meaningful model of processes affecting measurements to be taken.

In some situations, however, as indicated, potential influences may be complex. Therefore, seeking to understand appropriate factors to consider may be particularly challenging. In such situations, it is, therefore, not unusual to employ heuristics with respect to generating one or more estimates. Heuristics refers to use of experience related approaches that may reflect realized processes and/or realized results, such as with respect to use of historical measurements, for example. Heuristics, for example, may be employed in situations where more analytical approaches may be overly complex and/or nearly intractable. Thus, regarding claimed subject matter, an innovative feature may include, in an example embodiment, heuristics that may be employed, for example, to estimate and/or predict one or more measurements.

It is further noted that the terms "type" and/or "like," if used, such as with a feature, structure, characteristic, and/or the like, using "optical" or "electrical" as simple examples, means at least partially of and/or relating to the feature, structure, characteristic, and/or the like in such a way that presence of minor variations, even variations that might otherwise not be considered fully consistent with the feature, structure, characteristic, and/or the like, do not in general prevent the feature, structure, characteristic, and/or the like from being of a "type" and/or being "like," (such as being an "optical-type" or being "optical-like," for example) if the minor variations are sufficiently minor so that the feature, structure, characteristic, and/or the like would still be considered to be substantially present with such variations also present. Thus, continuing with this example, the terms optical-type and/or optical-like properties are necessarily intended to include optical properties. Likewise, the terms electrical-type and/or electrical-like properties, as another example, are necessarily intended to include electrical properties. It should be noted that the specification of the present patent application merely provides one or more illustrative examples and claimed subject matter is intended to not be limited to one or more illustrative examples; however, again, as has always been the case with respect to the specification of a patent application, particular context of description and/or usage provides helpful guidance regarding reasonable inferences to be drawn.

With advances in technology, it has become more typical to employ distributed computing and/or communication approaches in which portions of a process, such as signal processing of signal samples, for example, may be allocated among various devices, including one or more client devices and/or one or more server devices, via a computing and/or communications network, for example. A network may comprise two or more devices, such as network devices and/or computing devices, and/or may couple devices, such as network devices and/or computing devices, so that signal communications, such as in the form of signal packets and/or signal frames (e.g., comprising one or more signal samples), for example, may be exchanged, such as between a server device and/or a client device, as well as other types of devices, including between wired and/or wireless devices coupled via a wired and/or wireless network, for example.

In the context of the present patent application, the term network device refers to any device capable of communicating via and/or as part of a network and may comprise a computing device. While network devices may be capable of communicating signals (e.g., signal packets and/or frames), such as via a wired and/or wireless network, they may also be capable of performing operations associated with a computing device, such as arithmetic and/or logic operations, processing and/or storing operations (e.g., storing signal samples), such as in memory as tangible, physical memory states, and/or may, for example, operate as a server device and/or a client device in various embodiments. Network devices capable of operating as a server device, a client device and/or otherwise, may include, as examples, dedicated rack-mounted servers, desktop computers, laptop computers, set top boxes, tablets, netbooks, smart phones, wearable devices, integrated devices combining two or more features of the foregoing devices, and/or the like, or any combination thereof. As mentioned, signal packets and/or frames, for example, may be exchanged, such as between a server device and/or a client device, as well as other types of devices, including between wired and/or wireless devices coupled via a wired and/or wireless network, for example, or any combination thereof. It is noted that the terms, server, server device, server computing device, server computing platform and/or similar terms are used interchangeably. Similarly, the terms client, client device, client computing device, client computing platform and/or similar terms are also used interchangeably. While in some instances, for ease of description, these terms may be used in the singular, such as by referring to a "client device" or a "server device," the description is intended to encompass one or more client devices and/or one or more server devices, as appropriate.

Along similar lines, references to a "database" are understood to mean, one or more databases and/or portions thereof, as appropriate.

It should be understood that for ease of description, a network device (also referred to as a networking device) may be embodied and/or described in terms of a computing device and vice-versa. However, it should further be understood that this description should in no way be construed so that claimed subject matter is limited to one embodiment, such as a computing device exclusively and/or a network device exclusively, but, instead, may be embodied as a variety of devices or combinations thereof, including, for example, one or more illustrative examples.

A network may also include now known, and/or to be later developed arrangements, derivatives, and/or improvements, including, for example, past, present and/or future mass storage, such as network attached storage (NAS), a storage area network (SAN), and/or other forms of device readable media, for example. A network may include a portion of the Internet, one or more local area networks (LANs), one or more wide area networks (WANs), wire-line type connections, wireless type connections, other connections, or any combination thereof. Thus, a network may be worldwide in scope and/or extent. Likewise, sub-networks, such as may employ differing architectures and/or may be substantially compliant and/or substantially compatible with differing protocols, such as network computing and/or communications protocols (e.g., network protocols), may interoperate within a larger network.

In the context of the present patent application, the term sub-network and/or similar terms, if used, for example, with respect to a network, refers to the network and/or a part thereof. Sub-networks may also comprise links, such as physical links, connecting and/or coupling nodes, so as to be capable to communicate signal packets and/or frames between devices of particular nodes, including via wired links, wireless links, or combinations thereof. Various types of devices, such as network devices and/or computing devices, may be made available so that device interoperability is enabled and/or, in at least some instances, may be transparent. In the context of the present patent application, the term "transparent," if used with respect to devices of a network, refers to devices communicating via the network in which the devices are able to communicate via one or more intermediate devices, such as one or more intermediate nodes, but without the communicating devices necessarily specifying the one or more intermediate nodes and/or the one or more intermediate devices of the one or more intermediate nodes and/or, thus, may include within the network the devices communicating via the one or more intermediate nodes and/or the one or more intermediate devices of the one or more intermediate nodes, but may engage in signal communications as if such intermediate nodes and/or intermediate devices are not necessarily involved. For example, a router may provide a link and/or connection between otherwise separate and/or independent LANs.

In the context of the present patent application, a "private network" refers to a particular, limited set of devices, such as network devices and/or computing devices, able to communicate with other devices, such as network devices and/or computing devices, in the particular, limited set, such as via signal packet and/or signal frame communications, for example, without a need for re-routing and/or redirecting signal communications. A private network may comprise a stand-alone network; however, a private network may also comprise a subset of a larger network, such as, for example, without limitation, all or a portion of the Internet. Thus, for example, a private network "in the cloud" may refer to a private network that comprises a subset of the Internet. Although signal packet and/or frame communications (e.g. signal communications) may employ intermediate devices of intermediate nodes to exchange signal packets and/or signal frames, those intermediate devices may not necessarily be included in the private network by not being a source or designated destination for one or more signal packets and/or signal frames, for example. It is understood in the context of the present patent application that a private network may direct outgoing signal communications to devices not in the private network, but devices outside the private network may not necessarily be able to direct inbound signal communications to devices included in the private network.

The Internet refers to a decentralized global network of interoperable networks that comply with the Internet Protocol (IP). It is noted that there are several versions of the Internet Protocol. The term Internet Protocol, IP, and/or similar terms are intended to refer to any version, now known and/or to be later developed. The Internet includes local area networks (LANs), wide area networks (WANs), wireless networks, and/or long haul public networks that, for example, may allow signal packets and/or frames to be communicated between LANs. The term World Wide Web (WWW or Web) and/or similar terms may also be used, although it refers to a part of the Internet that complies with the Hypertext Transfer Protocol (HTTP). For example, network devices may engage in an HTTP session through an exchange of appropriately substantially compatible and/or substantially compliant signal packets and/or frames. It is noted that there are several versions of the Hypertext Transfer Protocol. The term Hypertext Transfer Protocol, HTTP, and/or similar terms are intended to refer to any version, now known and/or to be later developed. It is likewise noted that in various places in this document substitution of the term Internet with the term World Wide Web ("Web") may be made without a significant departure in meaning and may, therefore, also be understood in that manner if the statement would remain correct with such a substitution.

Although claimed subject matter is not in particular limited in scope to the Internet and/or to the Web; nonetheless, the Internet and/or the Web may without limitation provide a useful example of an embodiment at least for purposes of illustration. As indicated, the Internet and/or the Web may comprise a worldwide system of interoperable networks, including interoperable devices within those networks. The Internet and/or Web has evolved to a public, self-sustaining facility accessible to potentially billions of people or more worldwide. Also, in an embodiment, and as mentioned above, the terms "WWW" and/or "Web" refer to a part of the Internet that complies with the Hypertext Transfer Protocol. The Internet and/or the Web, therefore, in the context of the present patent application, may comprise a service that organizes stored digital content, such as, for example, text, images, video, etc., through the use of hypermedia, for example. It is noted that a network, such as the Internet and/or Web, may be employed to store electronic files and/or electronic documents.

A Hyper Text Markup Language ("HTML"), for example, may be utilized to specify digital content and/or to specify a format thereof, such as in the form of an electronic file and/or an electronic document, such as a Web page, Web site, etc., for example. An Extensible Markup Language ("XML") may also be utilized to specify digital content and/or to specify a format thereof, such as in the form of an electronic file and/or an electronic document, such as a Web page, Web site, etc., in an embodiment. Of course, HTML and/or XML are merely examples of "markup" languages, provided as non-limiting illustrations. Furthermore, HTML and/or XML are intended to refer to any version, now known and/or to be later developed, of these languages. Likewise, claimed subject matter are not intended to be limited to examples provided as illustrations, of course.

In the context of the present patent application, the term "Web site" and/or similar terms refer to Web pages that are associated electronically to form a particular collection thereof. Also, in the context of the present patent application, "Web page" and/or similar terms refer to an electronic file and/or an electronic document accessible via a network, including by specifying a URL for accessibility via the Web, in an example embodiment. As alluded to above, in one or more embodiments, a Web page may comprise digital content coded (e.g., via computer instructions) using one or more languages, such as, for example, markup languages, including HTML and/or XML, although claimed subject matter is not limited in scope in this respect. Also, in one or more embodiments, application developers may write code (e.g., computer instructions) in the form of JavaScript (or other programming languages), for example, executable by a computing device to provide digital content to populate an electronic document and/or an electronic file in an appropriate format, such as for use in a particular application, for example. Use of the term "JavaScript" and/or similar terms intended to refer to one or more particular programming languages are intended to refer to any version of the one or more programming languages identified, now known and/or to be later developed. Thus, JavaScript is merely an example programming language. As was mentioned, claimed subject matter is not intended to be limited to examples and/or illustrations.

In the context of the present patent application, the terms "entry," "electronic entry," "document," "electronic document," "content,", "digital content," "item," and/or similar terms are meant to refer to signals and/or states in a physical format, such as a digital signal and/or digital state format, e.g., that may be perceived by a user if displayed, played, tactilely generated, etc. and/or otherwise executed by a device, such as a digital device, including, for example, a computing device, but otherwise might not necessarily be readily perceivable by humans (e.g., if in a digital format). Likewise, in the context of the present patent application, digital content provided to a user in a form so that the user is able to readily perceive the underlying content itself (e.g., content presented in a form consumable by a human, such as hearing audio, feeling tactile sensations and/or seeing images, as examples) is referred to, with respect to the user, as "consuming" digital content, "consumption" of digital content, "consumable" digital content and/or similar terms. For one or more embodiments, an electronic document and/or an electronic file may comprise a Web page of code (e.g., computer instructions) in a markup language executed or to be executed by a computing and/or networking device, for example. In another embodiment, an electronic document and/or electronic file may comprise a portion and/or a region of a Web page. However, claimed subject matter is not intended to be limited in these respects.

Also, for one or more embodiments, an electronic document and/or electronic file may comprise a number of components. As previously indicated, in the context of the present patent application, a component is physical, but is not necessarily tangible. As an example, components with reference to an electronic document and/or electronic file, in one or more embodiments, may comprise text, for example, in the form of physical signals and/or physical states (e.g., capable of being physically displayed). Typically, memory states, for example, comprise tangible components, whereas physical signals are not necessarily tangible, although signals may become (e.g., be made) tangible, such as if appearing on a tangible display, for example, as is not uncommon. Also, for one or more embodiments, components with reference to an electronic document and/or electronic file may comprise a graphical object, such as, for example, an image, such as a digital image, and/or sub-objects, including attributes thereof, which, again, comprise physical signals and/or physical states (e.g., capable of being tangibly displayed). In an embodiment, digital content may comprise, for example, text, images, audio, video, and/or other types of electronic documents and/or electronic files, including portions thereof, for example.

Also, in the context of the present patent application, the term parameters (e.g., one or more parameters) refer to material descriptive of a collection of signal samples, such as one or more electronic documents and/or electronic files, and exist in the form of physical signals and/or physical states, such as memory states. For example, one or more parameters, such as referring to an electronic document and/or an electronic file comprising an image, may include, as examples, time of day at which an image was captured, latitude and longitude of an image capture device, such as a camera, for example, etc. In another example, one or more parameters relevant to digital content, such as digital content comprising a technical article, as an example, may include one or more authors, for example. Claimed subject matter is intended to embrace meaningful, descriptive parameters in any format, so long as the one or more parameters comprise physical signals and/or states, which may include, as parameter examples, collection name (e.g., electronic file and/or electronic document identifier name), technique of creation, purpose of creation, time and date of creation, logical path if stored, coding formats (e.g., type of computer instructions, such as a markup language) and/or standards and/or specifications used so as to be protocol compliant (e.g., meaning substantially compliant and/or substantially compatible) for one or more uses, and so forth.

Signal packet communications and/or signal frame communications, also referred to as signal packet transmissions and/or signal frame transmissions (or merely "signal packets" or "signal frames"), may be communicated between nodes of a network, where a node may comprise one or more network devices and/or one or more computing devices, for example. As an illustrative example, but without limitation, a node may comprise one or more sites employing a local network address, such as in a local network address space. Likewise, a device, such as a network device and/or a computing device, may be associated with that node. It is also noted that in the context of this patent application, the term "transmission" is intended as another term for a type of signal communication that may occur in any one of a variety of situations. Thus, it is not intended to imply a particular directionality of communication and/or a particular initiating end of a communication path for the "transmission" communication. For example, the mere use of the term in and of itself is not intended, in the context of the present patent application, to have particular implications with respect to the one or more signals being communicated, such as, for example, whether the signals are being communicated "to" a particular device, whether the signals are being communicated "from" a particular device, and/or regarding which end of a communication path may be initiating communication, such as, for example, in a "push type" of signal transfer or in a "pull type" of signal transfer. In the context of the present patent application, push and/or pull type signal transfers are distinguished by which end of a communications path initiates signal transfer.

Thus, a signal packet and/or frame may, as an example, be communicated via a communication channel and/or a communication path, such as comprising a portion of the Internet and/or the Web, from a site via an access node coupled to the Internet or vice-versa. Likewise, a signal packet and/or frame may be forwarded via network nodes to a target site coupled to a local network, for example. A signal packet and/or frame communicated via the Internet and/or the Web, for example, may be routed via a path, such as either being "pushed" or "pulled," comprising one or more gateways, servers, etc. that may, for example, route a signal packet and/or frame, such as, for example, substantially in accordance with a target and/or destination address and availability of a network path of network nodes to the target and/or destination address. Although the Internet and/or the Web comprise a network of interoperable networks, not all of those interoperable networks are necessarily available and/or accessible to the public.

In the context of the particular patent application, a network protocol, such as for communicating between devices of a network, may be characterized, at least in part, substantially in accordance with a layered description, such as the so-called Open Systems Interconnection (OSI) seven-layer type of approach and/or description. A network computing and/or communications protocol (also referred to as a network protocol) refers to a set of signaling conventions, such as for communication transmissions, for example, as may take place between and/or among devices in a network. In the context of the present patent application, the term "between" and/or similar terms are understood to include "among" if appropriate for the particular usage and vice-versa. Likewise, in the context of the present patent application, the terms "compatible with," "comply with" and/or similar terms are understood to respectively include substantial compatibility and/or substantial compliance.

A network protocol, such as protocols characterized substantially in accordance with the aforementioned OSI description, has several layers. These layers are referred to as a network stack. Various types of communications (e.g., transmissions), such as network communications, may occur across various layers. The lowest level layer in a network stack, such as the so-called physical layer, may characterize how symbols (e.g., bits and/or bytes) are communicated as one or more signals (and/or signal samples) via a physical medium (e.g., twisted pair copper wire, coaxial cable, fiber optic cable, wireless air interface, combinations thereof, etc.). Progressing to higher-level layers in a network protocol stack, additional operations and/or features may be available via engaging in communications that are substantially compatible and/or substantially compliant with a particular network protocol at these higher-level layers. For example, higher-level layers of a network protocol may, for example, affect device permissions, user permissions, etc.

A network and/or sub-network, in an embodiment, may communicate via signal packets and/or signal frames, such via participating digital devices and may be substantially compliant and/or substantially compatible with, but is not limited to, now known and/or to be developed, versions of any of the following network protocol stacks: ARCNET, AppleTalk, ATM, Bluetooth, DECnet, Ethernet, FDDI, Frame Relay, HIPPI, IEEE 1394, IEEE 802.11, IEEE-488, Internet Protocol Suite, IPX, Myrinet, OSI Protocol Suite, QsNet, RS-232, SPX, System Network Architecture, Token Ring, USB, and/or X.25. A network and/or sub-network may employ, for example, a version, now known and/or later to be developed, of the following: TCP/IP, UDP, DECnet, NetBEUI, IPX, AppleTalk and/or the like. Versions of the Internet Protocol (IP) may include IPv4, IPv6, and/or other later to be developed versions.

In one example embodiment, as shown in FIG. 13, a system embodiment may comprise a local network (e.g., device 1304 and medium 1340) and/or another type of network, such as a computing and/or communications network. For purposes of illustration, therefore, FIG. 13 shows an embodiment 1300 of a system that may be employed to implement either type or both types of networks. Network 1308 may comprise one or more network connections, links, processes, services, applications, and/or resources to facilitate and/or support communications, such as an exchange of communication signals, for example, between a computing device, such as 1302, and another computing device, such as 1306, which may, for example, comprise one or more client computing devices and/or one or more server computing device. By way of example, but not limitation, network 1308 may comprise wireless and/or wired communication links, telephone and/or telecommunications systems, Wi-Fi networks, Wi-MAX networks, the Internet, a local area network (LAN), a wide area network (WAN), or any combinations thereof.

Example devices in FIG. 13 may comprise features, for example, of a client computing device and/or a server computing device, in an embodiment. It is further noted that the term computing device, in general, whether employed as a client and/or as a server, or otherwise, refers at least to a processor and a memory connected by a communication bus. Likewise, in the context of the present patent application at least, this is understood to refer to sufficient structure within the meaning of 35 USC § 112 (f) so that it is specifically intended that 35 USC § 112 (f) not be implicated by use of the term "computing device" and/or similar terms; however, if it is determined, for some reason not immediately apparent, that the foregoing understanding cannot stand and that 35 USC § 112 (f), therefore, necessarily is implicated by the use of the term "computing device" and/or similar terms, then, it is intended, pursuant to that statutory section, that corresponding structure, material and/or acts for performing one or more functions be understood and be interpreted to be described at least in FIG. 13 and in the text associated with the foregoing figure of the present patent application.

Figure 14:
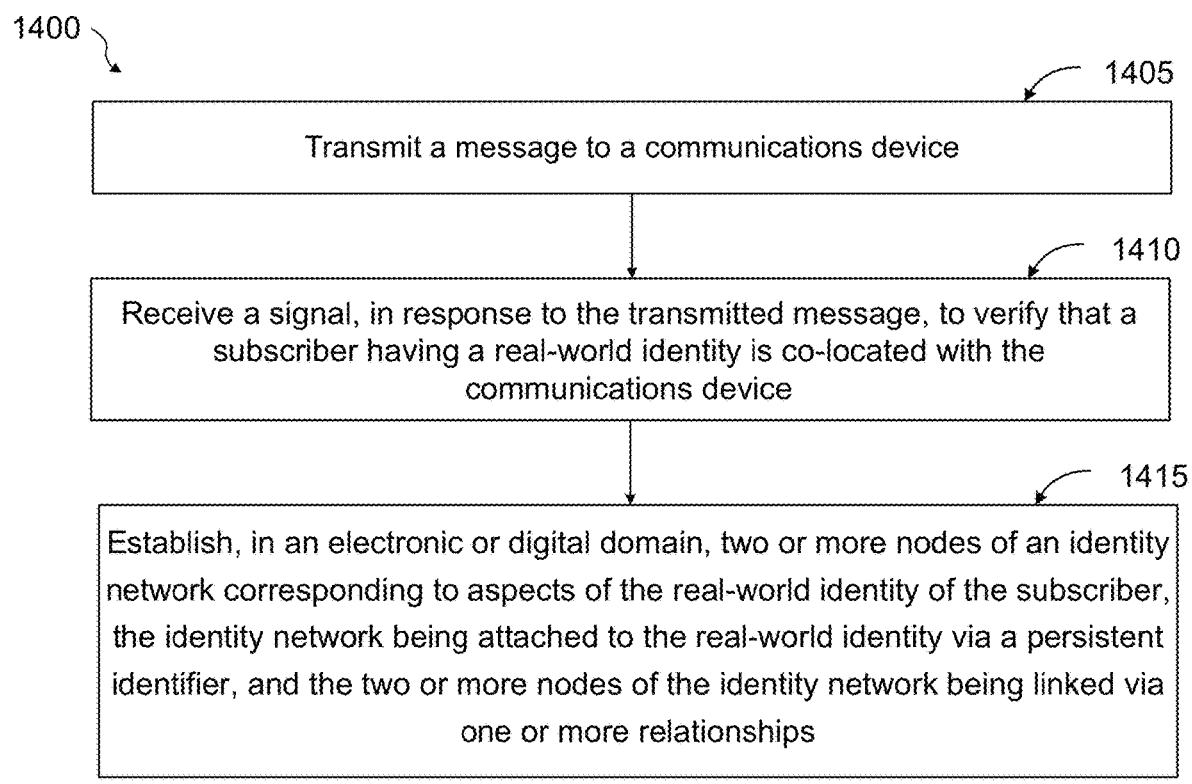
FIG. 14 is a flowchart for a method of representing electronically stored identity networks of a subscriber to a communication services carrier in an electronic or digital domain.

FIG. 14 is a flowchart for a method forming an identity network representation of a communications device subscriber, according to an embodiment (1400). It should be noted that the disclosed embodiments, such as the embodiment of FIG. 14, are intended to embrace numerous variations, including methods that may include actions in addition to those depicted in the figures, actions performed in an order different than those depicted in the figures, as well as methods including fewer steps than those depicted. The method of FIG. 14 begins at 1405, which includes transmitting a message to a communications device, such as communications device 102, for example. The method may continue at 1410, which includes receiving a signal, in response to the transmitted message, to verify that a subscriber having a real-world identity is co-located with the communications device. 1415 may include establishing, in an electronic or digital domain, two or more nodes of an identity network corresponding to aspects of the real-world identity of the subscriber. The identity network may be attached or tied to the real-world identity via a persistent identifier, and the two or more nodes of the identity network may be linked via one or more relationships.

In the preceding description, various aspects of claimed subject matter have been described. For purposes of explanation, specifics, such as amounts, systems and/or configurations, as examples, were set forth. In other instances, well-known features were omitted and/or simplified so as not to obscure claimed subject matter. While certain features have been illustrated and/or described herein, many modifications, substitutions, changes and/or equivalents will now occur to those skilled in the art. It is, therefore, to be understood that the appended claims are intended to cover all modifications and/or changes as fall within claimed subject matter.

It has proven convenient at times, principally for reasons of common usage, to refer to such physical signals and/or physical states as bits, values, elements, parameters, symbols, characters, terms, numbers, numerals, measurements, content and/or the like. It should be understood, however, that all of these and/or similar terms are to be associated with appropriate physical quantities and are merely convenient labels. Unless specifically stated otherwise, as apparent from the preceding discussion, it is appreciated that throughout this specification discussions utilizing terms such as "processing," "computing," "calculating," "determining", "establishing", "obtaining", "identifying", "selecting", "generating", and/or the like may refer to actions and/or processes of a specific apparatus, such as a special purpose computer and/or a similar special purpose computing and/or network device. In the context of this specification, therefore, a special purpose computer and/or a similar special purpose computing and/or network device is capable of processing, manipulating and/or transforming signals and/or states, typically in the form of physical electronic and/or magnetic quantities, within memories, registers, and/or other storage devices, processing devices, and/or display devices of the special purpose computer and/or similar special purpose computing and/or network device. In the context of this particular patent application, as mentioned, the term "specific apparatus" therefore includes a general purpose computing and/or network device, such as a general purpose computer, once it is programmed to perform particular functions, such as pursuant to program software instructions.

For one or more embodiments, a device, such as a computing device and/or networking device, may comprise, for example, any of a wide range of digital electronic devices, including, but not limited to, desktop and/or notebook computers, high-definition televisions, digital versatile disc (DVD) and/or other optical disc players and/or recorders, game consoles, satellite television receivers, cellular telephones, tablet devices, wearable devices, personal digital assistants, mobile audio and/or video playback and/or recording devices, Internet of Things (IOT) type devices, or any combination of the foregoing. Further, unless specifically stated otherwise, a process as described, such as with reference to flow diagrams and/or otherwise, may also be executed and/or affected, in whole or in part, by a computing device and/or a network device. A device, such as a computing device and/or network device, may vary in terms of capabilities and/or features. Claimed subject matter is intended to cover a wide range of potential variations. For example, a device may include a numeric keypad and/or other display of limited functionality, such as a monochrome liquid crystal display (LCD) for displaying text, for example. In contrast, however, as another example, a web-enabled device may include a physical and/or a virtual keyboard, mass storage, one or more accelerometers, one or more gyroscopes, global positioning system (GPS) and/or other location-identifying type capability, and/or a display with a higher degree of functionality, such as a touch-sensitive color 2D or 3D display, for example.

A computing and/or network device may include and/or may execute a variety of now known and/or to be developed operating systems, derivatives and/or versions thereof, including computer operating systems, such as Windows, iOS, Linux, a mobile operating system, such as iOS, Android, Windows Mobile, and/or the like. A computing device and/or network device may include and/or may execute a variety of possible applications, such as a client software application enabling communication with other devices. For example, one or more messages (e.g., content) may be communicated, such as via one or more protocols, now known and/or later to be developed, suitable for communication of email, short message service (SMS), and/or multimedia message service (MMS), including via a network, such as a social network, formed at least in part by a portion of a computing and/or communications network, including, but not limited to, an Internet service provider, a social network platform, just to provide a few examples. A computing and/or network device may also include executable computer instructions to process and/or communicate digital content, such as, for example, textual content, digital multimedia content, and/or the like. A computing and/or network device may also include executable computer instructions to perform a variety of possible tasks, such as browsing, searching, playing various forms of digital content, including locally stored and/or streamed video, and/or games such as, but not limited to, fantasy sports leagues. The foregoing is provided merely to illustrate that claimed subject matter is intended to include a wide range of possible features and/or capabilities.

In some circumstances, operation of a memory device, such as a change in state from a binary one to a binary zero or vice-versa, for example, may comprise a transformation, such as a physical transformation. With particular types of memory devices, such a physical transformation may comprise a physical transformation of an article to a different state or thing. For example, but without limitation, for some types of memory devices, a change in state may involve an accumulation and/or storage of charge or a release of stored charge. Likewise, in other memory devices, a change of state may comprise a physical change, such as a transformation in magnetic orientation. Likewise, a physical change may comprise a transformation in molecular structure, such as from crystalline form to amorphous form or vice-versa. In still other memory devices, a change in physical state may involve quantum mechanical phenomena, such as, superposition, entanglement, and/or the like, which may involve quantum bits (qubits), for example. The foregoing is not intended to be an exhaustive list of all examples in which a change in state from a binary one to a binary zero or vice-versa in a memory device may comprise a transformation, such as a physical, but non-transitory, transformation. Rather, the foregoing is intended as illustrative examples.

What is claimed is:

1. A method comprising:
   receiving, by an identity verifier computing device from a communications device, a signal to verify a subscriber is co-located with a communications device, wherein the subscriber has a real-world identity;
   establishing, by the identity verifier computing device, a plurality of nodes of an identity network, wherein:

the identity network exists in an electronic or digital domain, the identity network is associated with the real-world identity via a persistent identifier, each node in the plurality of nodes is associated with the persistent identifier via a set of links, and each link in the set of links includes a trustworthiness parameter;

responsive to a first set of interactions by a first aspect of a set of aspects with at least a first node of the plurality of nodes, updating, by the identity verifier computing device, a first trustworthiness parameter of a first link between a second node of the plurality of nodes and a second aspect of the set of aspects; and transmitting, by the identity verifier computing device to the communications device, a verification that the subscriber is co-located with the communications device, wherein the verification is based, at least in part, on the first link.

2. The method of claim 1, wherein the persistent identifier comprises a subscriber-account identifier.

3. The method of claim 1, wherein the set of aspects comprises one or more of:

an electronic mail address of the real-world identity, an Internet protocol address of the real-world identity, a wireline telephone number of the real-world identity, an identifier of an ancillary device, an institutional account of the real-world identity, a healthcare account, and/or a transaction account of the real-world identity.

4. The method of claim 3, further comprising:

establishing one or more additional links between or among the plurality of nodes of the identity network responsive to one or more electronically determined events with respect to the real-world identity.

5. The method of claim 4, wherein the one or more electronically determined events with respect to the real-world identity correspond to one or more of a second set of interactions between the real-world identity and one or more aspects of the set of aspects.

6. The method of claim 5, further comprising:

assigning a confidence score to the real-world identity in the electronic or digital domain; and revising the confidence score based, at least in part, on the one or more of the second set of interactions between the real-world identity and the one or more aspects of the set of aspects.

7. The method of claim 6, wherein the confidence score is based, at least in part, on one or more deterministic events with respect to the communications device.

8. The method of claim 6, further comprising accessing a data store to detect one or more deterministic events in relation to historical norms with respect to the communications device.

9. The method of claim 8, wherein the one or more deterministic events with respect to the communications device correspond to an online event, and wherein the online event comprises one or more of:

a reassignment of a subscriber account identifier from a first communication services carrier to a second communication services carrier, a purchase or replacement of the communications device, a removal and/or replacement of a subscriber identity module (SIM), and/or a password reset of the communications device.

10. The method of claim 1, further comprising:

revising the plurality of nodes of the identity network to exclude the persistent identifier.

11. The method of claim 1, further comprising:

grouping the plurality of nodes of the identity network into one or more relationship groups, wherein the one or more relationship groups comprise one or more of:

a content group, a transactions group, a financial group, a family group, a household group, a group associated with a physical address of the subscriber, a social network group, and/or a merchant group.

12. An apparatus comprising:

at least one processor of an identity verifier computing device coupled to at least one memory device of the identity verifier computing device to:

receive, by the identity verifier computing device, a signal to verify a subscriber is co-located with a communications device, wherein the subscriber has a real-world identity;

establish, by the identity verifier computing device, a plurality of nodes of an identity network, wherein:

the identity network exists in an electronic or digital domain;

the identity network is associated with the real-world identity via a persistent identifier, each node in the plurality of nodes is associated with the persistent identifier via a set of links, and each link in the set of links includes a trustworthiness parameter;

responsive to a first set of interactions by a first aspect of a set of aspects with at least a first node of the plurality of nodes, update, by the identity verifier computing device, a first trustworthiness parameter of a first link between a second node of the plurality of nodes and a second aspect of the set of aspects; and transmit, by the identity verifier computing device to the communications device, a verification that the subscriber is co-located with the communications device, wherein the verification is based, at least in part, on the first link.

13. The apparatus of claim 12, wherein the persistent identifier comprises a subscriber account identifier.

14. The apparatus of claim 12, wherein the set of aspects comprises one or more of:

an electronic mail address of the real-world identity, an Internet protocol address of the real-world identity, a wireline telephone number of the real-world identity, an identifier of an ancillary device, an institutional account of the real-world identity, a healthcare account, and/or a transaction account of the real-world identity.

15. The apparatus of claim 14, wherein the at least one processor coupled of the identity verifier computing device to the at least one memory device of the identity verifier computing device are additionally to establish one or more additional links between or among the plurality of nodes of the identity network responsive to one or more electronically determined events with respect to the real-world identity, wherein the one or more electronically determined events with respect to the real-world identity correspond to one or more of a second set of interactions between the real-world identity and one or more aspects of the set of aspects.

16. The apparatus of claim 15, wherein the at least one processor of the identity verifier computing device coupled to the at least one memory device of the identity verifier computing device are further to:
  assign a confidence score to the real-world identity in the electronic or digital domain based at least in part on one or more deterministic events with respect to the communications device; and
  revise the confidence score based, at least in part, on the one or more of the second set of interactions between the real-world identity and the one or more aspects of the set of aspects.

17. The apparatus of claim 16, wherein the at least one processor of the identity verifier computing device coupled to the at least one memory device of the identity verifier computing device are further to access a data store to detect one or more deterministic events in relation to historical norms with respect to the communications device.

18. The apparatus of claim 17, wherein the one or more deterministic events with respect to the communications device correspond to an online event, and wherein the online event comprises one or more of:
  a reassignment of a subscriber account identifier from a first communication services carrier to a second communication services carrier,
  a purchase or replacement of the communications device,
  a removal and/or replacement of a subscriber identity module (SIM), and/or
  a password reset of the communications device.

19. An article comprising:
  a non-transitory storage medium having instructions stored thereon which, when executed by a processor of an identity verifier computing device coupled to at least one memory of the identity verifier computing device, are operable to:
  receive, by an identity verifier computing device, a signal to verify a subscriber is co-located with a communications device, wherein the subscriber has a real-world identity;
  establish, by the identity verifier computing device, a plurality of nodes of an identity network, wherein:
    the identity network exists in an electronic or digital domain;
    the identity network is associated with the real-world identity via a persistent identifier,
    each node in the plurality of nodes is associated with the persistent identifier via a set of links, and
    each link in the set of links includes a trustworthiness parameter;
  responsive to a first set of interactions by a first aspect of a set of aspects with at least a first node of the plurality of nodes, update, by the identity verifier computing device, a first trustworthiness parameter of a first link between a second node of the plurality of nodes and a second aspect of the set of aspects; and
  transmit, by the identity verifier computing device to the communications device, a verification that the subscriber is co-located with the communications device, wherein the verification is based, at least in part, on the first link.

20. The article of claim 19, wherein the stored instructions are additionally operable to revise the plurality of nodes of the identity network to exclude the persistent identifier.

21. The article of claim 19, wherein the set of aspects comprises one or more of:
  an electronic mail address of the real-world identity,
  an Internet protocol address of the real-world identity,
  a wireline telephone number of the real-world identity,
  an identifier of an ancillary device,
  an institutional account of the real-world identity,
  a healthcare account, and/or
  a transaction account of the real-world identity.

22. The article of claim 21, wherein the stored instructions are additionally operable to establish one or more additional links between or among the plurality of nodes of the identity network responsive to one or more electronically determined events with respect to the real-world identity, wherein the one or more electronically determined events with respect to the real-world identity correspond to one or more of a second set of interactions between the real-world identity and one or more aspects of the set of aspects.

23. The article of claim 22, wherein stored instructions are additionally operable to:
  assign a confidence score to the real-world identity in the electronic or digital domain based at least in part on one or more deterministic events with respect to the communications device; and
  revise the confidence score based, at least in part, on the one or more of the second set of interactions between the real-world identity and the one or more aspects of the set of aspects.

24. The article of claim 23, wherein the stored instructions are additionally operable to access a data store to detect one or more deterministic events in relation to historical norms with respect to the communications device.

25. The article of claim 24, wherein the one or more deterministic events with respect to the communications device correspond to an online event, and wherein the online event comprises one or more of:
  a reassignment of a subscriber account identifier from a first communication services carrier to a second communication services carrier,
  a purchase or replacement of the communications device,
  a removal and/or replacement of a subscriber identity module (SIM), and/or
  a password reset of the communications device.

* * * * *